(12) United States Patent
Melrose et al.

(10) Patent No.: US 12,403,606 B2
(45) Date of Patent: *Sep. 2, 2025

(54) METHODS AND SYSTEMS OF GENERATING CAMERA MODELS FOR CAMERA CALIBRATION

(71) Applicant: Quartus Engineering Incorporated, San Diego, CA (US)

(72) Inventors: Jesse Melrose, San Diego, CA (US); Matthew Pearson, San Diego, CA (US); Jordan Liss, San Diego, CA (US); Julia Wetherill, San Diego, CA (US); Brian Dunne, San Diego, CA (US)

(73) Assignee: Quartus Engineering Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/035,685

(22) Filed: Jan. 23, 2025

(65) Prior Publication Data

US 2025/0162158 A1  May 22, 2025

Related U.S. Application Data

(63) Continuation of application No. 17/897,012, filed on Aug. 26, 2022, now Pat. No. 12,240,129.

(60) Provisional application No. 63/260,690, filed on Aug. 29, 2021.

(51) Int. Cl.
*G06F 17/00* (2019.01)
*B25J 9/16* (2006.01)
*G06T 7/80* (2017.01)

(52) U.S. Cl.
CPC .......... *B25J 9/1692* (2013.01); *B25J 9/1697* (2013.01); *G06T 7/80* (2017.01)

(58) Field of Classification Search
CPC .......... B25J 9/1692; B25J 9/1697; G06T 7/80
USPC ...................................................... 700/254
See application file for complete search history.

(56) References Cited

U.S. PATENT DOCUMENTS

| | | |
|---|---|---|
| 6,437,823 B1 | 8/2002 | Zhang |
| 8,049,779 B2 | 11/2011 | Poulin et al. |
| 8,095,237 B2 | 1/2012 | Habibi et al. |
| 8,485,017 B1 | 7/2013 | Trompeter |
| 9,928,595 B2 | 3/2018 | Martinello et al. |
| 9,965,870 B2 | 5/2018 | Claveau et al. |
| 10,475,209 B2 | 11/2019 | Shen et al. |
| 10,690,492 B2 | 6/2020 | Wei et al. |
| 10,873,739 B2 | 12/2020 | Kumagai et al. |
| 11,181,624 B2 | 11/2021 | Gui et al. |

(Continued)

FOREIGN PATENT DOCUMENTS

| | | | | |
|---|---|---|---|---|
| CN | 118119972 A | * | 5/2024 | ............ B25J 9/1692 |
| JP | 2024536925 A | * | 6/2022 | |

(Continued)

OTHER PUBLICATIONS

A calibration strategy for vision-guided robot assembly system of large cabin (Year: 2020).*

(Continued)

*Primary Examiner* — Ronnie M Mancho
(74) *Attorney, Agent, or Firm* — SNELL & WILMER L.L.P.

(57) ABSTRACT

Systems and methods for generating a camera model are provided.

20 Claims, 26 Drawing Sheets

(56) References Cited

U.S. PATENT DOCUMENTS

| | | | |
|---|---|---|---|
| 11,320,406 B2 * | 5/2022 | Franzen | G01N 29/30 |
| 11,423,566 B2 | 8/2022 | Mayer et al. | |
| 11,503,275 B2 | 11/2022 | Kranski et al. | |
| 11,919,177 B1 | 3/2024 | Gao et al. | |
| 12,240,129 B2 * | 3/2025 | Melrose | B25J 9/1697 |
| 2003/0130576 A1 | 7/2003 | Seeley et al. | |
| 2015/0130951 A1 | 5/2015 | Olson et al. | |
| 2016/0016317 A1 | 1/2016 | Trompeter | |
| 2017/0221226 A1 | 8/2017 | Shen et al. | |
| 2021/0302391 A1 | 9/2021 | Franzen | |
| 2022/0147026 A1 | 5/2022 | Poelman et al. | |
| 2023/0070281 A1 * | 3/2023 | Melrose | B25J 9/1697 |

FOREIGN PATENT DOCUMENTS

| | | | | |
|---|---|---|---|---|
| WO | 2005043076 | | 5/2005 | |
| WO | 2005073669 | | 8/2005 | |
| WO | 2012105727 | | 8/2012 | |
| WO | 2021012124 | | 1/2021 | |
| WO | WO-2023034150 A1 * | 3/2023 | | B25J 9/1692 |

OTHER PUBLICATIONS

"Evaluating the Accuracy of Single Camera Calibration." Evaluating the Accuracy of Single Camera Calibration—MATLAB Simulink, [Retrieved on Mar. 9, 2023] Retrieved from the Internet <URL: https://www.mathworks.com/help/vision/ug/evaluating-the-accuracy-of-single-camera-calibration.html>.

* cited by examiner

Camera Mount on CMM

Illuminated Chart in Fixture

Optical CMM Inspection of Chart Features to SMRs

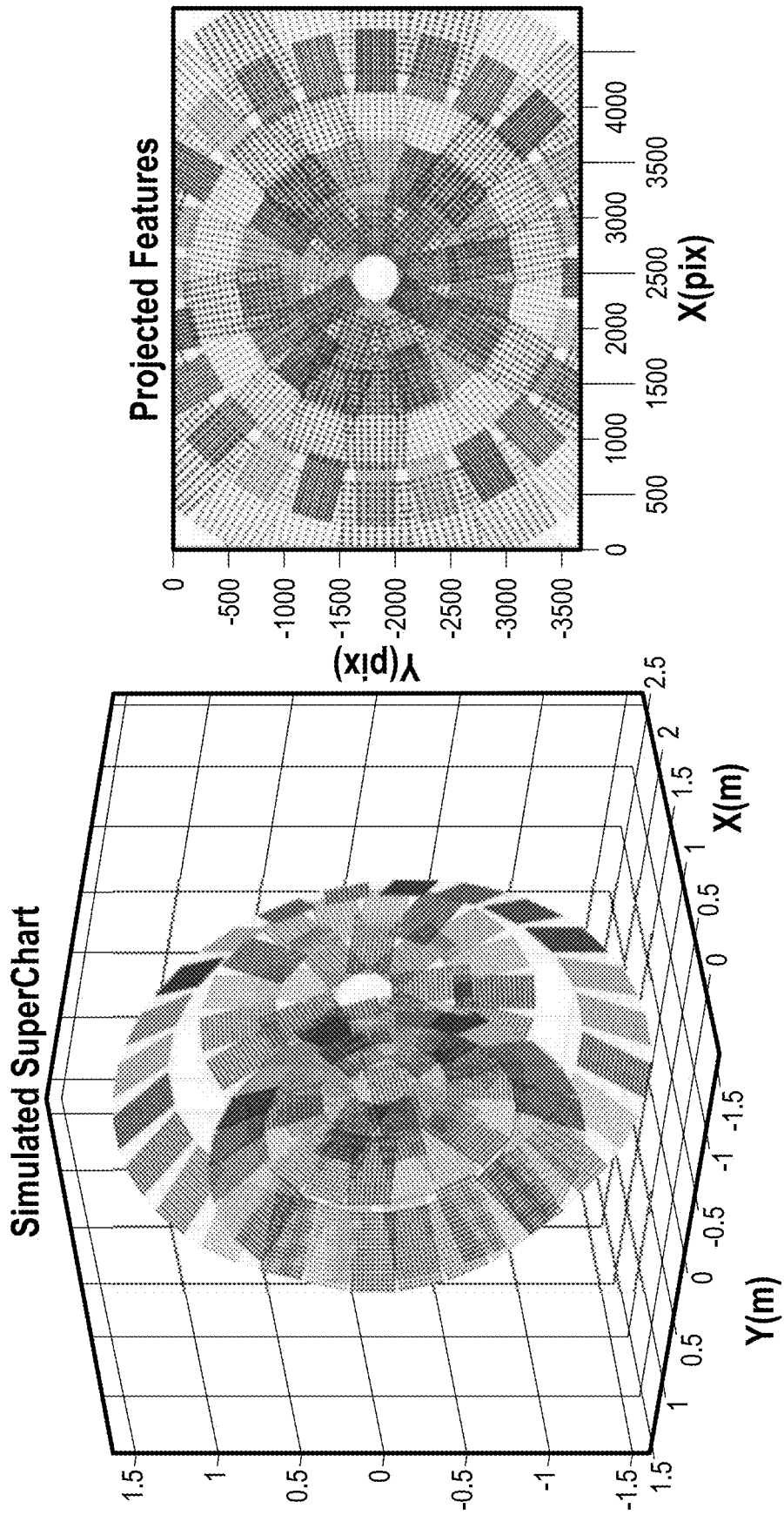

METHODS AND SYSTEMS OF GENERATING CAMERA MODELS FOR CAMERA CALIBRATION

CROSS-REFERENCE TO RELATED APPLICATIONS

This application is a continuation of U.S. application Ser. No. 17/897,012, filed Aug. 26, 2022, which claims the benefit of U.S. Provisional Patent Application No. 63/260,690, filed Aug. 29, 2021 and entitled "CAMERA CALIBRATION," the contents of both of which are incorporated by reference herein.

FIELD

This application generally relates to camera models, in particular the generation of camera models.

BACKGROUND

Camera models are widely used across many industries. For example, in robotics and autonomous vehicles, camera models may be used to aid in visual odometry, localization, mapping, visual servoing (also known as vision-based robot control), and object recognition. In industrial automation, camera models may be used to aid in flaw identification and size measurement. In smartphone technologies, camera models may be used to aid in panoramic image stitching, augmented reality, and facial (face) recognition. In optics, camera models may be used to aid in optical metrology, satellite pointing stabilization, and image undistortion (e.g., in reversing distortions found in images). In agriculture, camera models may be used to aid in crop health monitoring. In defense applications, camera models may be used to aid in remote measurement, terrain mapping, and surveillance. In the biological sciences, camera models may be used to aid in microscope calibration and size measurement. In entertainment applications, camera models may be used to aid in virtual reality, photography, and motion sensing games (e.g., Xbox Kinect). In research applications, camera models may be used to aid in determining structure from motion and in 3D reconstruction.

SUMMARY

Methods and systems for generating camera models and systems for generating camera models for camera calibration are provided herein.

Some examples herein provide a method of generating a camera model. The method may include using a robotic assembly to move a calibration assembly relative to a camera assembly, or to move the camera assembly relative to the calibration assembly, through a predetermined series of poses. The calibration assembly may include a calibration target. The calibration assembly may include first, second, and third calibration assembly markers. The first, second, and third calibration assembly markers may be coupled to the calibration target at respective positions. The camera assembly may include a mount. The camera assembly may include a camera coupled to the mount at a respective location and having a field of view (FOV). The camera assembly may include first, second, and third camera assembly markers coupled to the mount at respective positions. The predetermined series of poses, together, cause the calibration target to pass through at least a portion of the FOV of the camera. The method may include using the camera, at each pose of the predetermined series of poses, to generate a respective image of the calibration target. The method may include using a tracker, at each pose of the predetermined series of poses, to determine respective locations in space of the first, second, and third calibration assembly markers.

The method may include using a tracker, at each pose of the predetermined series of poses, to determine respective locations in space of the first, second, and third camera assembly markers. The method may include for each respective image, generating a transformation function that maps onto a three-dimensional object space (i) stored coordinates of the first, second, and third calibration assembly markers, (ii) stored coordinates of the first, second, and third camera assembly markers, (iii) the determined locations in space, for that image, of the first, second, and third calibration assembly markers, (iv) the determined locations in space, for that image, of the first, second, and third camera assembly markers, and (v) features of the calibration target within the respective image. The method may include using the transformation functions for the respective images to generate a model of extrinsic parameters and intrinsic parameters of the camera.

In some examples, the calibration assembly may further include a fourth calibration assembly marker coupled to the calibration target. In some examples, the method may include using a tracker, at each pose of the predetermined series of poses, to determine respective locations in space of the first, second, third, and fourth calibration assembly markers.

In some examples, the camera assembly may further include a fourth camera assembly marker coupled to the mount. In some examples, the method may include using a tracker, at each pose of the predetermined series of poses, to determine respective locations in space of the first, second, third, and fourth camera assembly markers.

In some examples, the calibration assembly markers may respectively include spherically mounted retroreflectors (SMRs).

In some examples, the camera assembly markers may respectively include spherically mounted retroreflectors (SMRs).

In some examples, the mount may include a pin-diamond pin mount.

In some examples, the tracker may include a laser tracker.

In some examples, the method may further include determining the coordinates of the first, second, and third camera assembly markers in the camera mount datum frame. In some examples, determining the coordinates of the first, second, and third camera assembly markers in the camera mount datum frame may be performed using a coordinate measuring machine (CMM).

In some examples, the calibration target may include a rectilinear checkerboard chart.

In some examples, the calibration target may include a self-identifying binary code. In some examples, the self-identifying binary code may include CALTag or ARTag.

In some examples, the method may further include determining the locations of features of the calibration target relative to the first, second, and third calibration assembly markers. In some examples, determining the locations of features of the calibration target relative to the first, second, and third calibration assembly markers may be performed using an optical measuring machine (OMM).

In some examples, the predetermined series of poses, together, may cause the calibration target to generate a superchart. In some examples, the superchart may include a hemispherical shape. In some examples, the superchart may include multiple layers.

In some examples, the method may further include for each respective image, processing the image before for each respective image, generating a transformation function that maps onto a three-dimensional object space (i) stored coordinates of the first, second, and third calibration assembly markers, (ii) stored coordinates of the first, second, and third camera assembly markers, (iii) the determined locations in space, for that image, of the first, second, and third calibration assembly markers, (iv) the determined locations in space, for that image, of the first, second, and third camera assembly markers, and (v) features of the calibration target within the respective image. In some examples, the processing of the image may include at least one of object detection, smoothing, edge enhancing, and morphological operations.

In some examples, the method may further include again using a robotic assembly to move a calibration assembly relative to a camera assembly, or to move the camera assembly relative to the calibration assembly, through a predetermined series of poses; again using the camera, at each pose of the predetermined series of poses, to generate a respective image of the calibration target; again using a tracker, at each pose of the predetermined series of poses, to determine respective locations in space of the first, second, and third calibration assembly markers and respective locations in space of the first, second, and third camera assembly markers; and for each respective image, again generating a transformation function that maps onto a three-dimensional object space (i) stored coordinates of the first, second, and third calibration assembly markers, (ii) stored coordinates of the first, second, and third camera assembly markers, (iii) the determined locations in space, for that image, of the first, second, and third calibration assembly markers, (iv) the determined locations in space, for that image, of the first, second, and third camera assembly markers, and (v) features of the calibration target within the respective image; with a different predetermined series of poses to generate an audit data set of extrinsic parameters and intrinsic parameters of the camera. In some examples, the method may further include using the determined locations in space of the first, second, and third calibration assembly markers from the audit data set; the determined locations in space of the first, second, and third camera assembly markers from the audit data set; and the camera model to determine the image space error and the object space error of the camera model.

Some examples herein provide a system for generating a camera model. The system may include a calibration assembly. The calibration assembly may include a calibration target. The calibration assembly may include first, second, and third calibration assembly markers. The first, second, and third calibration assembly markers may be coupled to the calibration target at respective positions. The system may include a camera assembly. The camera assembly may include a mount. The camera assembly may include a camera. The camera may be coupled to the mount at a respective location and have a field of view (FOV). The system may include first, second, and third camera assembly markers. The first, second, and third camera assembly markers may be coupled to the mount at respective positions. The system may include a robotic assembly. The robotic assembly may be coupled to at least one of the calibration assembly and the camera assembly. The system may include a tracker. The system may include a computer system. The computer system may be coupled to the camera, the robotic assembly, and the tracker. The computer system may include at least one processor and at least one non-volatile computer-readable medium. The at least one non-volatile computer-readable medium may store coordinates of the first, second, and third calibration assembly markers relative to one another and relative to the calibration target. The at least one non-volatile computer-readable medium may store coordinates of the first, second, and third camera assembly markers relative to one another and relative to the camera. The at least one non-volatile computer-readable medium may further store instructions for causing the processor to perform operations.

The operations may include instructing the robotic assembly to move the calibration assembly relative to the camera assembly, or to move the camera assembly relative to the calibration assembly, through a predetermined series of poses that, together, cause the calibration target to pass through at least a portion of the FOV of the camera; instructing the camera, at each pose of the predetermined series of poses, to generate a respective image of the calibration target; instructing the tracker, at each pose of the predetermined series of poses, to determine respective locations in space of the first, second, and third calibration assembly markers and respective locations in space of the first, second, and third camera assembly markers; for each respective image, generating a transformation function that maps onto a three-dimensional object space (i) the stored coordinates of the first, second, and third calibration assembly markers, (ii) the stored coordinates of the first, second, and third camera assembly markers, (iii) the determined respective locations in space, for that image, of the first, second, and third calibration assembly markers, (iv) the determined respective locations in space, for that image, of the first, second, and third camera assembly markers, and (v) features of the calibration target within the respective image; and using the transformation functions for the respective images to generate a model of extrinsic parameters and intrinsic parameters of the camera.

In some examples, the calibration assembly may further include a fourth calibration assembly marker coupled to the calibration target. In some examples, the at least one non-volatile computer-readable medium may store the coordinates of the fourth calibration assembly marker relative to the first, second, and third calibration assembly markers and relative to the calibration target. In some examples, the at least one non-volatile computer-readable medium may store coordinates of the fourth calibration assembly marker. In some examples the instructions may further include instructing the tracker, at each pose of the predetermined series of poses, to determine the respective location in space of the fourth calibration assembly marker, and for each respective image, generating a transformation function that maps onto a three-dimensional object space the stored coordinates of the fourth calibration assembly marker.

In some examples, the camera assembly may further include a fourth camera assembly marker coupled to the mount. In some examples, the at least one non-volatile computer-readable medium may store the coordinates of the fourth camera assembly marker relative to the first, second, and third camera assembly markers and relative to the camera. In some examples, the at least one non-volatile computer-readable medium may store coordinates of the fourth camera assembly marker. In some examples, the instructions may further include instructing the tracker, at each pose of the predetermined series of poses, to determine the respective location in space of the fourth camera assembly marker, for each respective image, generating a transformation function that maps onto a three-dimensional object space the stored coordinates of the fourth camera assembly marker, and for each respective image, generating a transformation function that maps onto a three-dimensional object space the determined coordinates of the fourth camera assembly marker.

In some examples, the calibration assembly markers may respectively include spherically mounted retroreflectors (SMRs).

In some examples, the camera assembly markers may respectively include spherically mounted retroreflectors (SMRs).

In some examples, the mount may include a pin-diamond pin mount.

In some examples, the tracker may include a laser tracker.

In some examples, the stored coordinates of the first, second, and third camera assembly markers relative to one another and relative to the camera may be determined using a coordinate measuring machine (CMM).

In some examples, the calibration target may include a rectilinear checkerboard chart.

In some examples, the calibration target may include a self-identifying binary code. In some examples, the self-identifying binary code may include CALTag or ARTag.

In some examples, the at least one non-volatile computer-readable medium may store coordinates of features of the calibration target relative to the first, second, and third calibration assembly markers. In some examples, the stored coordinates of features of the calibration target relative to the first, second, and third calibration assembly markers may be determined using an optical measurement machine (OMM).

In some examples, the predetermined series of poses, together, may cause the calibration target to generate a superchart. In some examples, the superchart may include a hemispherical shape. In some examples, the superchart may include multiple layers.

In some examples, the instructions may further include for each respective image, processing the image before generating a transformation function. In some examples, the processing of the image may include at least one of object detection, smoothing, edge enhancing, and morphological operations.

In some examples, the instructions may further include repeating the operations in the instructions with a different predetermined series of poses to generate an audit data set. In some examples, the instructions may further include using the determined locations in space of the first, second, and third calibration assembly markers from the audit data set; the determined locations in space of the first, second, and third camera assembly markers from the audit data set; and the camera model to determine the image space error and the object space error of the camera model.

It is to be understood that any respective features/examples of each of the aspects of the disclosure as described herein may be implemented together in any appropriate combination, and that any features/examples from any one or more of these aspects may be implemented together with any of the features of the other aspect(s) as described herein in any appropriate combination to achieve the benefits as described herein.

BRIEF DESCRIPTION OF DRAWINGS

FIG. 1 is adapted from Samvram Sahu, *3D Pose Estimation of UAVs using Stereo-vision* (May 2019) (BTech thesis, Indian Space Rsrch. Org.), the entire contents of which are incorporated by reference herein.

FIG. 2 is adapted from Bharath Hariharan, *Geometry of Image Formation* (Cornell University, Mar. 25, 2020), the entire contents of which are incorporated by reference herein.

FIG. 3 is adapted from Igor Kozlov, *Analysis of Uncertainty in Underwater Multiview Reconstruction* (September 2018) (M. S. thesis, Univ. N. H.) and J. V. Sharp and H. H. Hayes, *Effects on Map Production of Distortions in Photogrammetric Systems,* 15 Photogrammetric Engineering 159 (1949), the entire contents of each of which are incorporated by reference herein.

FIG. 4 is adapted from in Benjamin Pichler, *HDR Light Field* (Sep. 10, 2012) (B. S. thesis, Johannes Kepler Univ. Linz), the entire contents of which are incorporated by reference herein.

FIG. 5 is adapted from *opencv-camera* 0.11.0, Python Package Index, (last visited Aug. 11, 2022), the entire contents of which are incorporated by reference herein.

FIG. 16A illustrates another example multi-layer hemispherical superchart.

FIG. 16B illustrates the example multi-layer hemispherical superchart of FIG. 16A projected into 2D image space.

It is to be understood that any respective features/examples of each of the aspects of the disclosure as described herein may be implemented together in any appropriate combination, and that any features/examples from any one or more of these aspects may be implemented together with any of the features of the other aspect(s) as described herein in any appropriate combination to achieve the benefits as described herein.

DETAILED DESCRIPTION

Methods and systems for generating camera models and systems for generating camera models for camera calibration are provided herein.

Subject matter which may be described and claimed in any suitable combination includes hardware (system), including a camera mounted with calibrated tracker targets (camera assembly), a test chart (calibration target) mounted with calibrated tracker targets (calibration assembly), a tracker, an apparatus to move the camera relative to the test chart (calibration target) (robotic assembly), an apparatus to store and correlate images and position data (computer system), and apparatus to perform image processing and model parameter calculation (computer system).

Subject matter which may be described and claimed in any suitable combination also includes a method, including planning motion based on a desired camera characterization; for each position in the plan (i) aligning the camera and test chart (calibration target) using a tracker, (ii) recording the camera position and test chart (calibration target) position, and (iii) taking camera images; processing images and position coordinates, including (i) detecting features in the images, (ii) pairing the features with 3D position coordinates, (iii) applying camera model calibration logic, and (iv) outputting camera model parameters.

Some variants of subject matter which may be described and claimed in any suitable combination includes variants using various tracker numbers and configurations, e.g., square vs. triangle configurations, variants where the tracker is a laser tracker and also alternates, variants where tracker targets (markers) are spherically mounted retro-reflectors (SMRs) and also alternates, variants performing registration of the camera tracker target (camera assembly) using a coordinate measuring machine (CMM), variants performing registration of the test chart tracker target (calibration assembly) using an optical measuring machine (OMM), variants performing image filtering before feature detection, variants including CAL Tags on the test chart (calibration target), variants including non-linear optimization, and variants using an audit data set.

As provided herein, a camera model is a simplification of the complex geometric and optical properties of a camera system into a mathematical model with a relatively small set of known parameters. A good model can help address a fundamental problem in computer vision: using 2D information from a camera to gain information about the 3D world.

Figure 1:
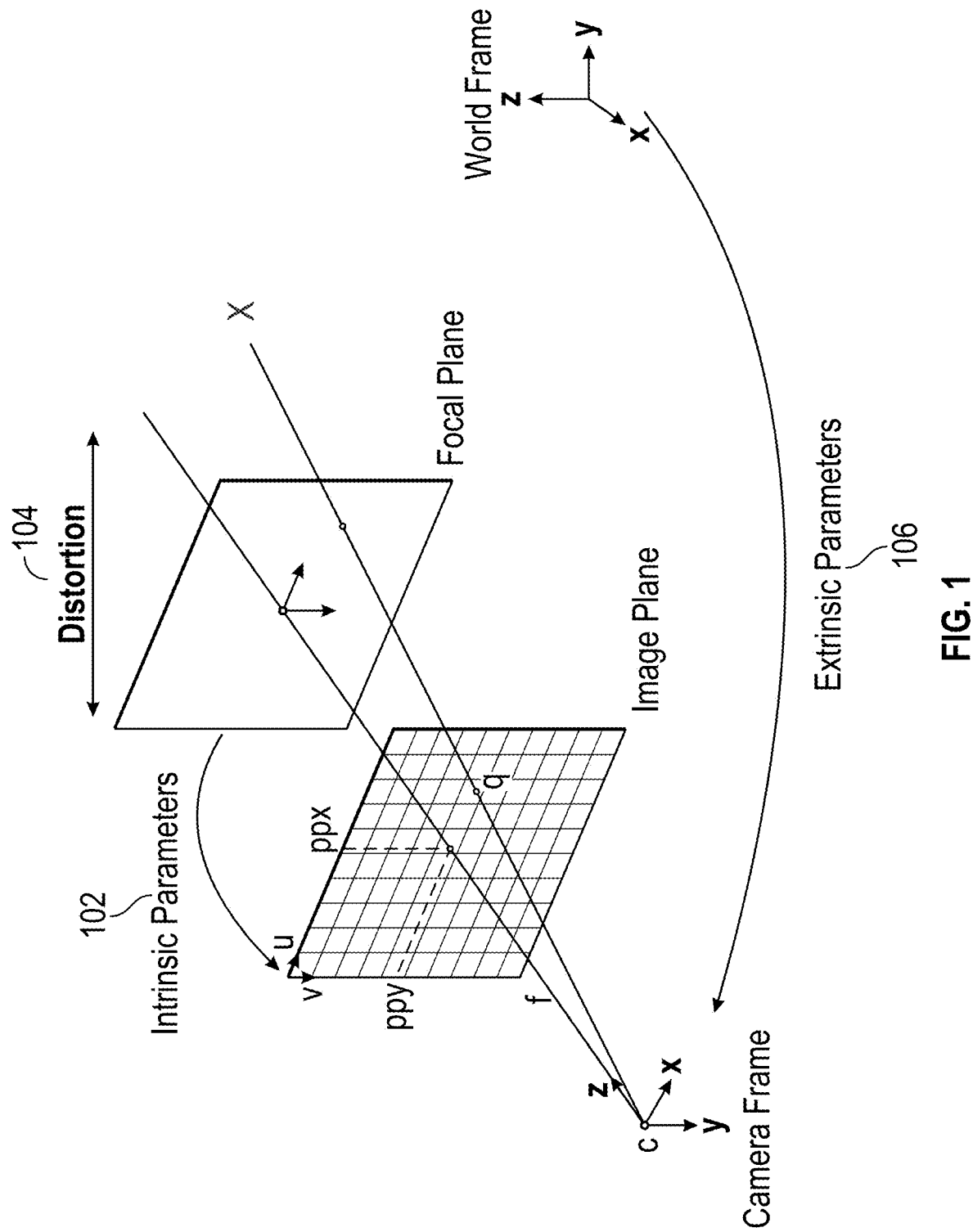
FIG. 1 illustrates three primary areas to consider with camera models.

FIG. 1 illustrates three primary areas to consider with camera models. There are three primary areas to consider with camera models: intrinsic parameters 102, distortions 104, and extrinsic parameters 106. Intrinsic parameters 102 include the focal length and principal point of the camera. Distortions 104 are deviations from a simple pinhole camera, and include symmetric radial distortions, asymmetric radial distortions, and tangential distortions. Extrinsic parameters 106 include the elements of a 3D rotation matrix and position vector that represent the position of the camera relative to some external reference coordinate system.

Intrinsic Parameters

Figure 2:
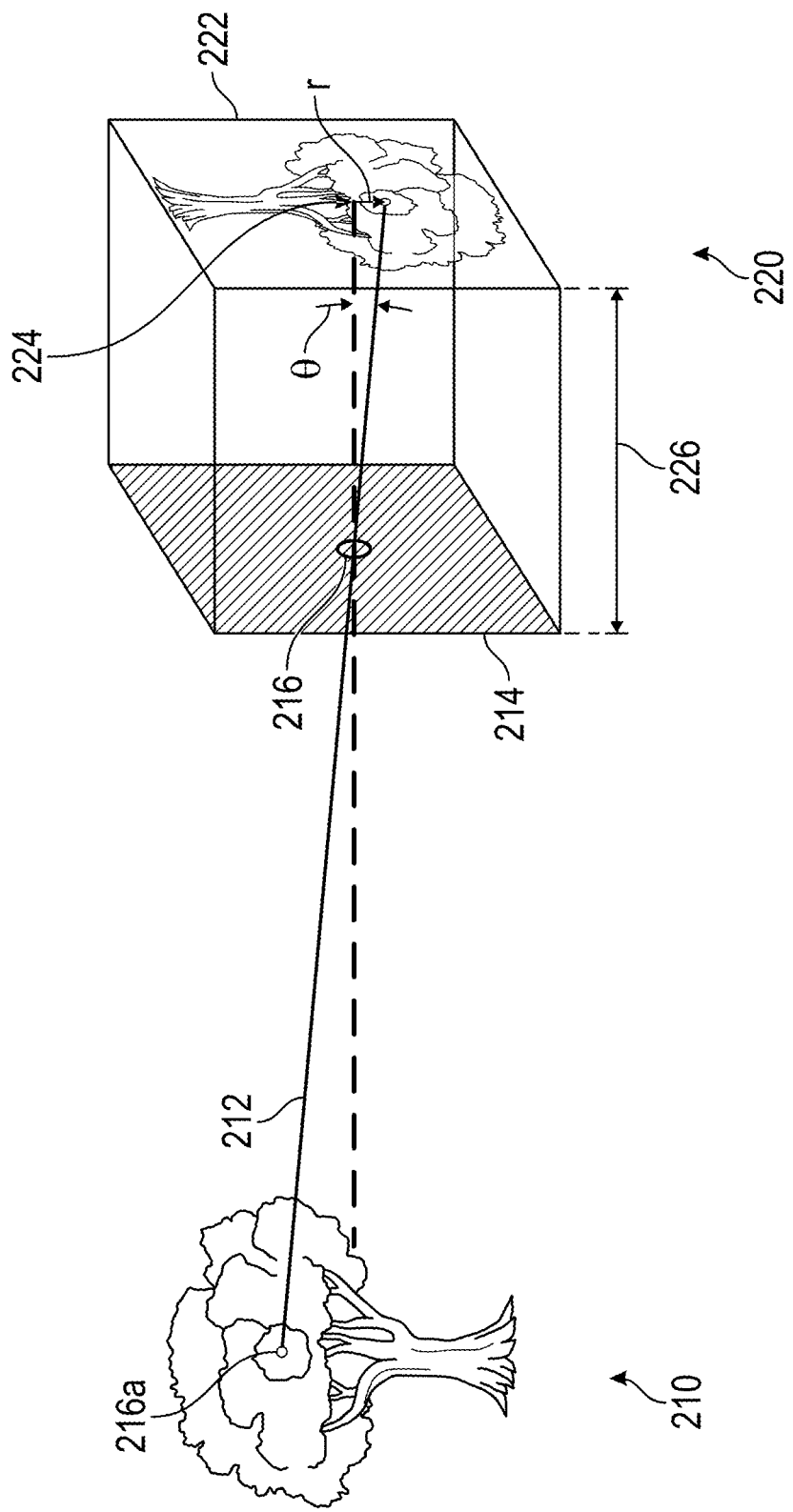
FIG. 2 illustrates an example simple pinhole model of a camera.

FIG. 2 illustrates an example simple pinhole model of a camera. In a simple pinhole model of a camera, three-dimensional objects in the object space 210 are mapped onto a two-dimensional image space 220 and captured by a sensor 222. Incoming light rays 212 land on the sensor 222 from a point 216 on an object according to: $r = f \times \tan \theta$, where r is the distance on the sensor plane 222 from the principal point 224 (directly across the pinhole aperture of the barrier plane) and the focal length f 226 is the distance from the sensor 222 to the barrier plane 214. The angle $\theta$ is measured from the direction normal to the barrier plane 214 at the aperture 216. The focal length 226 and principal point 224 are known as the camera's intrinsic parameters.

Distortion

Figure 3:
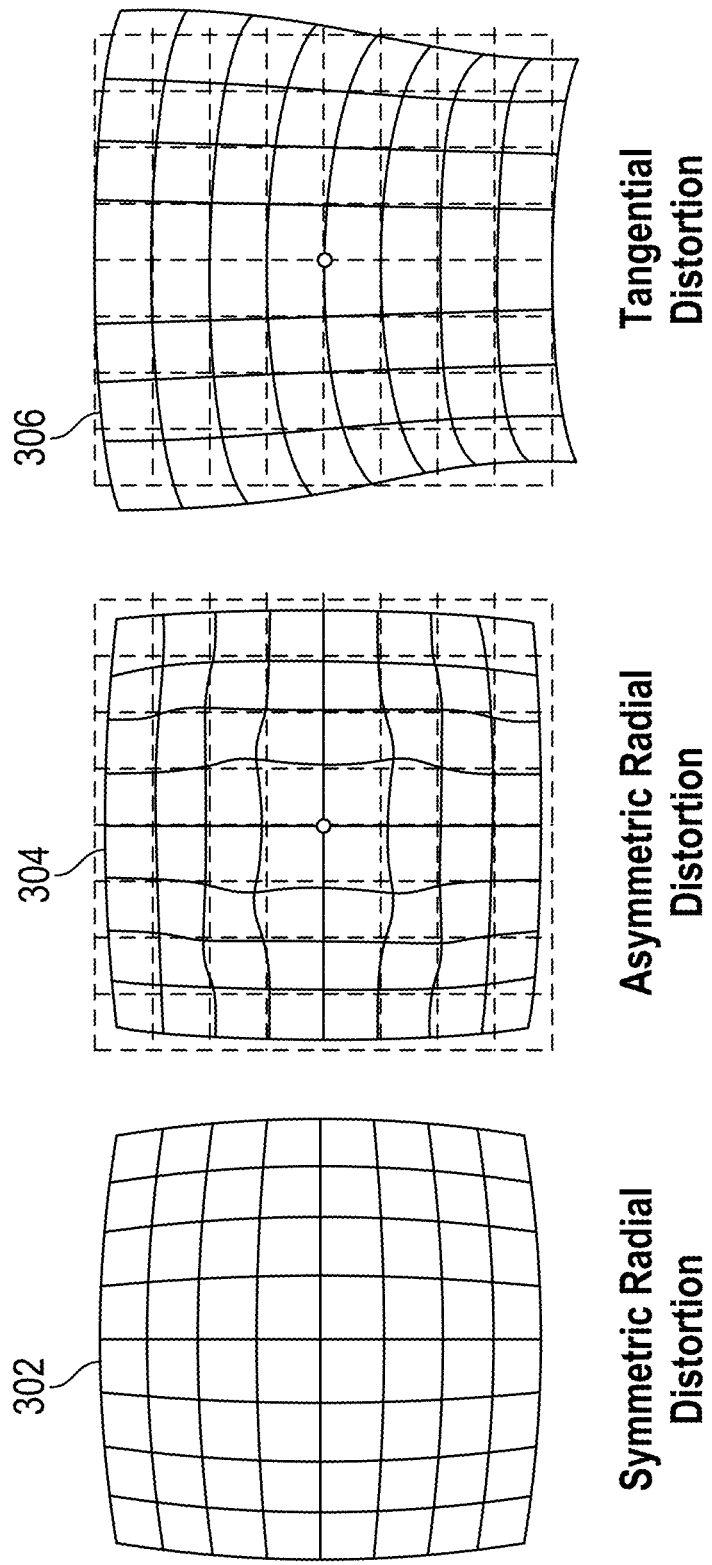
FIG. 3 illustrates three common camera distortions.

By characterizing a camera's distortion, we can understand how it deviates from this simple pinhole camera. FIG. 3 illustrates three common camera distortions. Three common distortions are symmetric radial distortions 302, asymmetric radial distortions 304, and tangential distortions 306. Radial distortions distort image points along the radial direction from the camera's principal point. Symmetric radial distortions 302 do this symmetrically for the entire image, while asymmetric radial distortions 304 may vary with the polar angle about the principal point. Tangential distortions 306 distort image points in the direction perpendicular to the radial distortion from the camera's principal point.

Extrinsic Parameters

The position of the camera relative to some reference coordinate system is typically represented as a 3D rotation matrix and position vector or as a transformation matrix. The elements of these matrices are known as the extrinsic parameters.

Figure 4:
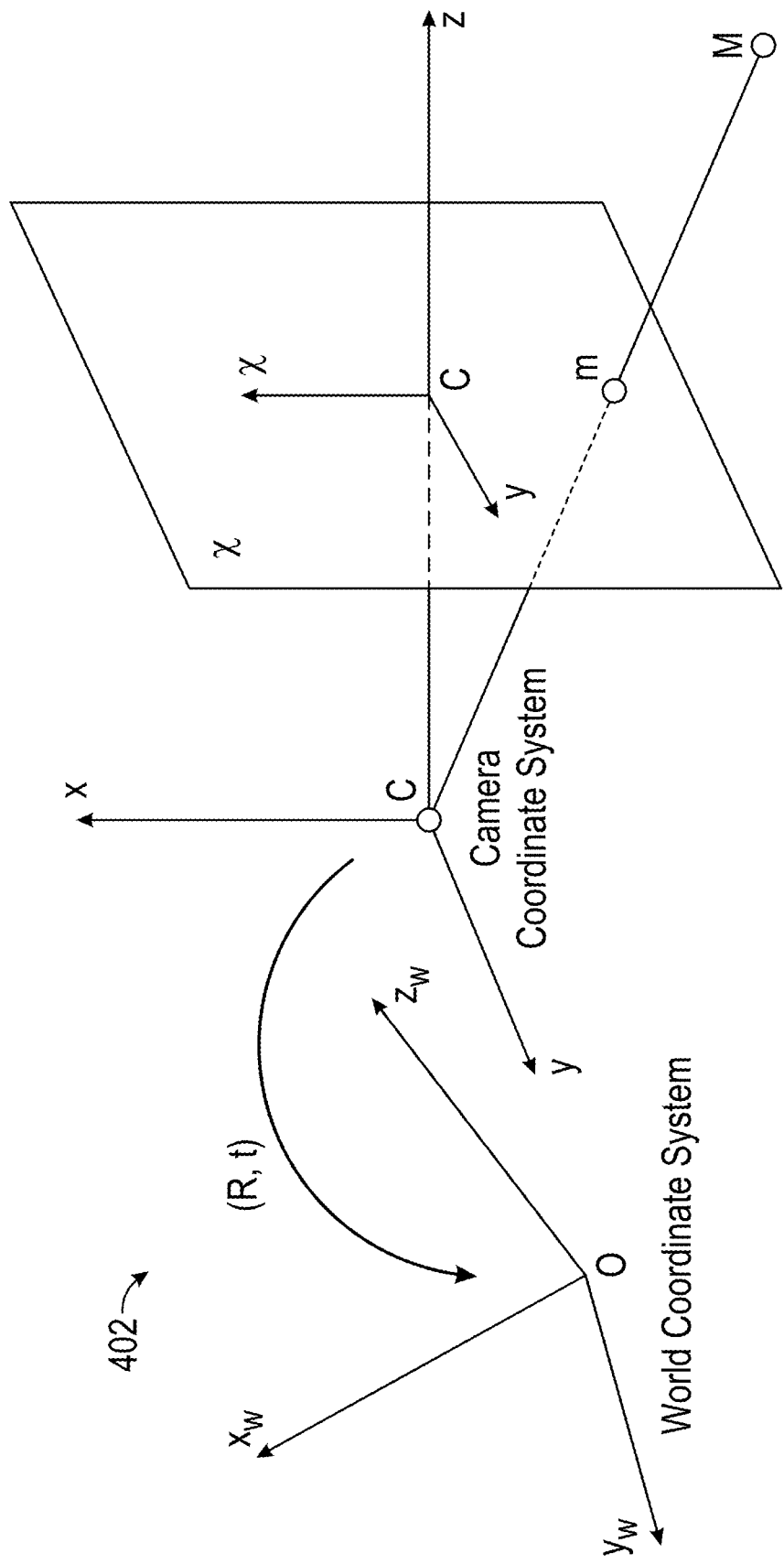
FIG. 4 illustrates extrinsic parameters of a camera.

FIG. 4 illustrates extrinsic parameters of a camera. Extrinsic parameters 402 are in some cases used or required to extract spatial information about imaged targets in a global coordinate system. This may be useful, and in some cases is particularly critical, for example in some cases when multiple cameras are used together or when imaging cameras are used in conjunction with other sensors (e.g., an inertial measurement unit (IMU) sensor, a light detection and ranging (LIDAR) sensor, etc.) for fused sensor data outputs. The traceability of an extrinsic camera calibration is one of the more challenging aspects of performing the calibration.

Camera Calibration

Figure 5:
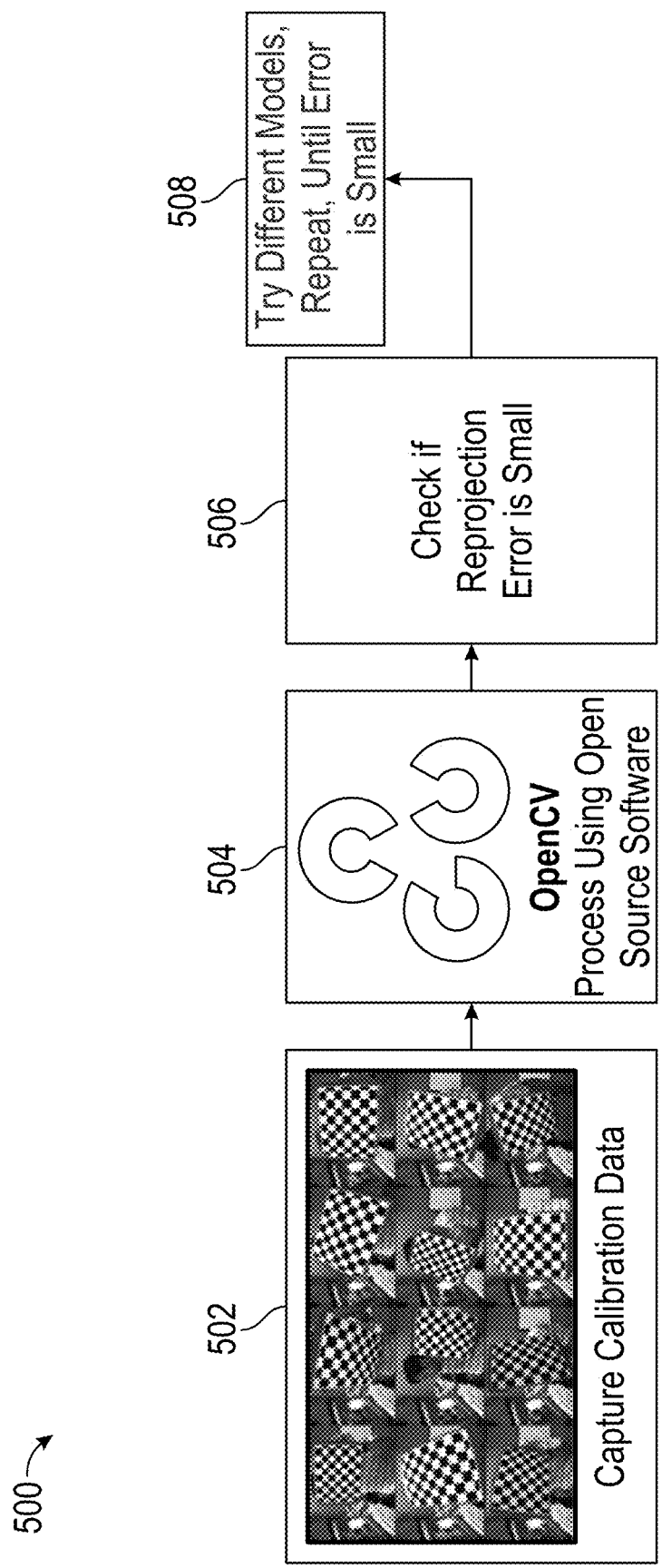
FIG. 5 illustrates an example of a workflow for image processing.

FIG. 5 illustrates an example of a workflow for image processing. In a typical previously known camera calibration, the parameters are identified in an iterative process 500.

Once calibration data images are captured from known images 502, the images are processed using open source tools such as OpenCV (Open Source Computer Vision Library) 504, an open source computer vision and machine learning software library. The resulting reprojection images are compared to the original known images 506. If the error is above a threshold, the process is repeated with different models until the error is acceptable 508.

Flexible Camera Calibration Station Design

Camera calibration techniques as previously known in the art typically work well for a specific set of camera parameters (object distance, field of view, etc.) but struggle to accommodate a wide range of camera parameters in the same calibration fixture. There are many reasons for this relatively poor performance, including: relatively inaccurate extrinsic parameters determination, relatively poor distortion model accuracy over full field of view, a possible requirement for large physical charts, and others.

Figure 6:
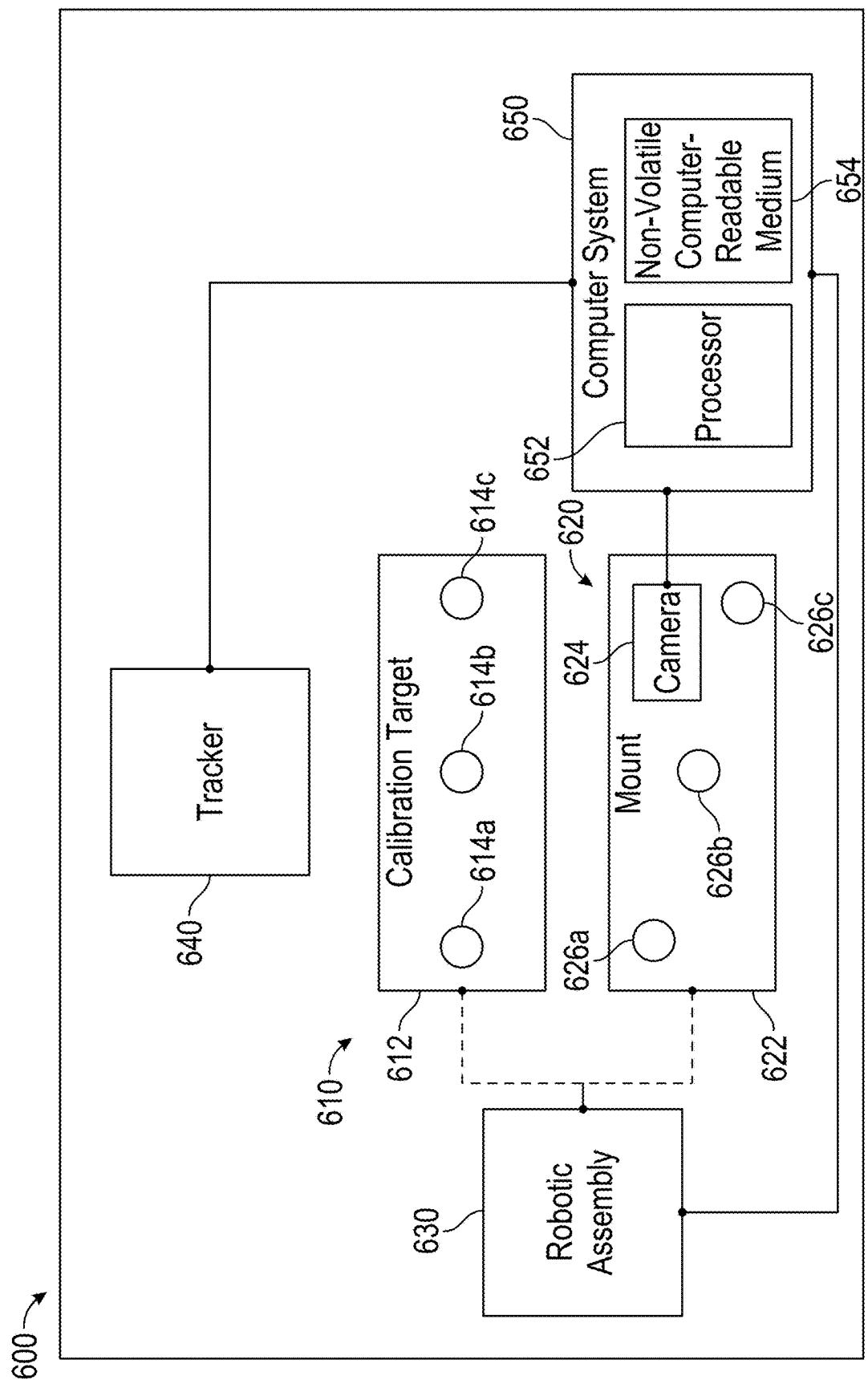
FIG. 6 illustrates an example of a system for generating camera models.

As recognized by the present inventors, a flexible camera calibration station can be used to overcome these and other calibration performance issues. FIG. 6 illustrates an example of a system for generating camera models. System 600 illustrated in FIG. 6 may include a calibration assembly 610, a camera assembly 620, a robotic assembly 630, a tracker 640, and a computer system 650. The calibration assembly 610 may include a calibration target 612, and any suitable number of calibration assembly markers, e.g., a first calibration assembly marker 614a, second calibration assembly marker 614b, and a third calibration assembly marker 614c, coupled to the calibration target 612 at respective positions. The camera assembly 620 may include a mount 622, a camera 624, any suitable number of camera assembly markers, e.g., a first camera assembly marker 626a, second camera assembly marker 626b, and third camera assembly marker 626c, coupled to the mount 622 at respective positions. The camera 624 may have a field of view (FOV). The robotic assembly 630 may be coupled to at least one of calibration assembly 610 and the camera assembly 620, as indicated by the dashed lines.

The computer system 650 may include a processor 652 and at least one non-volatile computer-readable medium 654. The computer system 650 may be coupled to the robotic assembly 630, the camera 624, and the tracker 640. The at least one non-volatile computer-readable medium 654 may store coordinates of the first, second, and third calibration assembly markers 614 relative to one another and relative to the calibration target 612. The at least one non-volatile computer-readable medium 654 may store coordinates of the first, second, and third camera assembly markers 626 relative to one another and relative to the camera 624. The at least one non-volatile computer-readable medium 654 may store instructions for causing the processor 652 to perform operations. The operations may include instructing the robotic assembly 630 to move the calibration assembly 610 relative to the camera assembly 620, or to move the camera assembly 620 relative to the calibration assembly 610, through a predetermined series of poses that, together, cause the calibration target 612 to pass through at least a portion of the field of view of the camera 624. The operations may include instructing the camera 624, at each pose of the predetermined series of poses, to generate a respective image of the calibration target 612. The operations may include instructing the tracker 640, at each pose of the predetermined series of poses, to determine respective locations in space of the first, second, and third calibration assembly markers 614 and respective locations in space of the first, second, and third camera assembly markers 626.

The operations may include for each respective image, generating a transformation function that maps onto a three-dimensional object space (i) the stored coordinates of the first, second, and third calibration assembly markers 614, (ii) the stored coordinates of the first, second, and third camera assembly markers 626, (iii) the determined respective locations in space, for that image, of the first, second, and third calibration assembly markers 614, (iv) the determined respective locations in space, for that image, of the first, second, and third camera assembly markers 626, and (v) features of the calibration target 612 within the respective image. The operations may include using the transformation functions for the respective images to generate a model of extrinsic parameters and intrinsic parameters of the camera 624.

Figure 7:
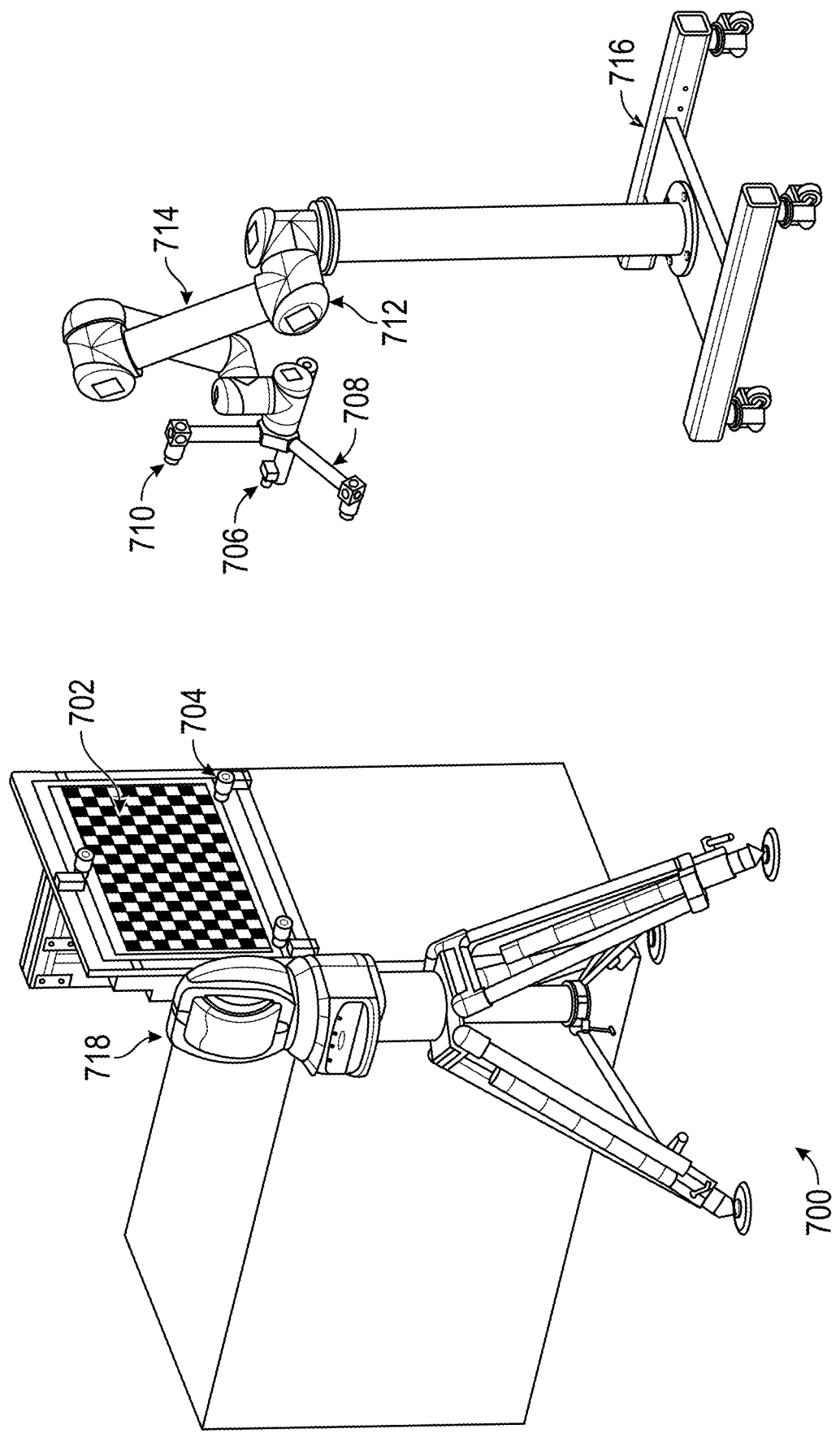
FIG. 7 illustrates an example of another system for generating camera models.

FIG. 7 illustrates an example of another system for generating camera models. One example of a flexible camera calibration station (system for generating a camera model) 700 is shown in the figure. It comprises a test chart (calibration target) 702 with calibration assembly markers (e.g., rigidly attached spherically mounted retroreflectors (SMRs)) 704 that is observed by a camera under test 706 that is also mounted to a mount (e.g., an interface bracket) 708 with camera assembly markers (e.g., SMRs) 710. The test chart (calibration target) 702 may be fixed or mounted onto a movable platform. The camera under test is mounted onto a robotic assembly (e.g., an articulating robot arm) 712. This camera under test assembly (camera assembly) 714 may be mounted onto a rolling platform 716 for convenience. The relative positions of all the calibration assembly markers 704 and camera assembly markers (e.g. SMRs) 710 can be monitored with a tracker (e.g., a laser tracker) 718. Note that due to the design of the system architecture, relative motion between the camera 706 and test chart (calibration target) 702 is important to generate rich calibration data sets, but there is no requirement that the camera 706 specifically move or the test chart (calibration target) 702 move. The system architecture is flexible for either or both components moving such that camera systems 714 that are difficult to manipulate for calibration may remain stationary.

Figure 8:
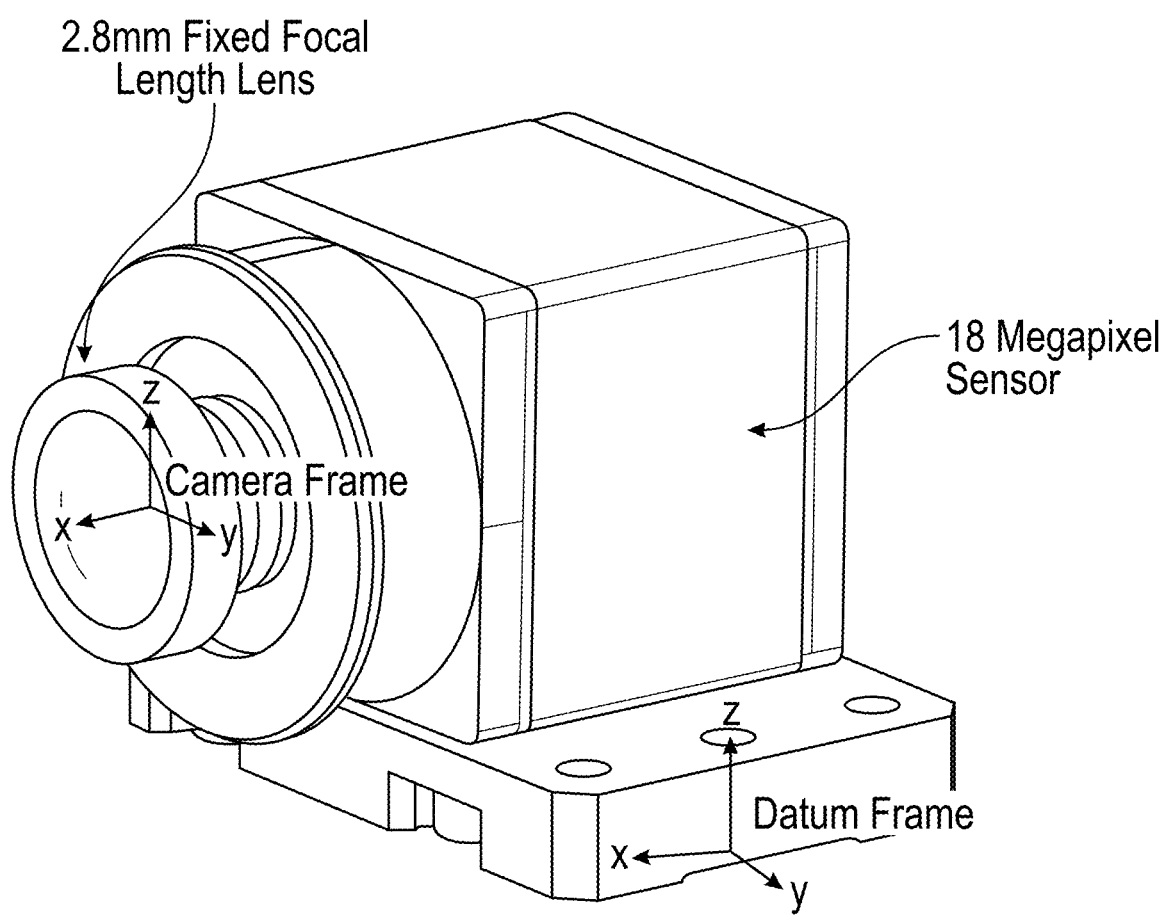
FIG. 8 illustrates an example of a camera.

FIG. 8 illustrates an example of a camera. An example camera has an 18 megapixel 2.8 mm fixed focal length lens with high resolution over a large field of view (FOV) (157 degrees). A pin-diamond pin mount may be used as a repeatable and traceable datum for the camera extrinsic parameters, since the relative position between the camera frame and the datum frame is fixed due to the rigid construction of the subject camera.

Figure 9B:
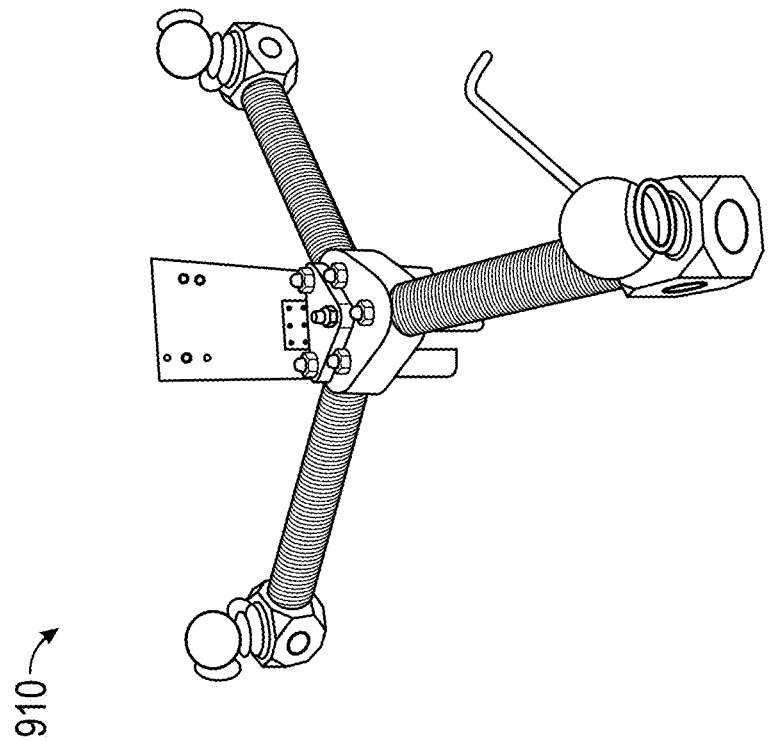
FIG. 9B illustrates a photograph of an example camera assembly on a coordinate measuring machine (CMM).
Figure 9A:
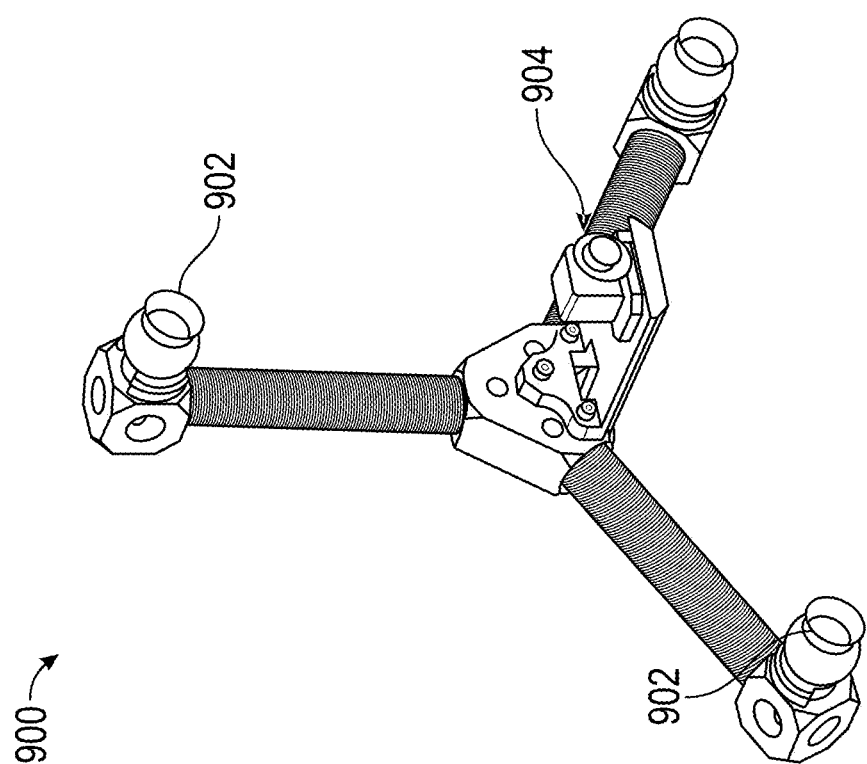
FIG. 9A illustrates an example of a camera assembly.

FIG. 9A illustrates an example of a camera assembly. An example camera mount 900 is shown. In some examples, spherically mounted retro-reflectors (SMRs) 902 may be mounted to the camera mount 900 to create traceable point measurements of the mount's 900 and camera's (camera assembly's) 904 location for the tracker (e.g., laser tracker).

FIG. 9B illustrates a photograph of an example camera assembly on a coordinate measuring machine (CMM). A photograph of an example camera mount 900 on a CMM 910 in shown. A CMM 910 may be used to measure the SMR center coordinates in the camera mount datum frame.

Figure 10:
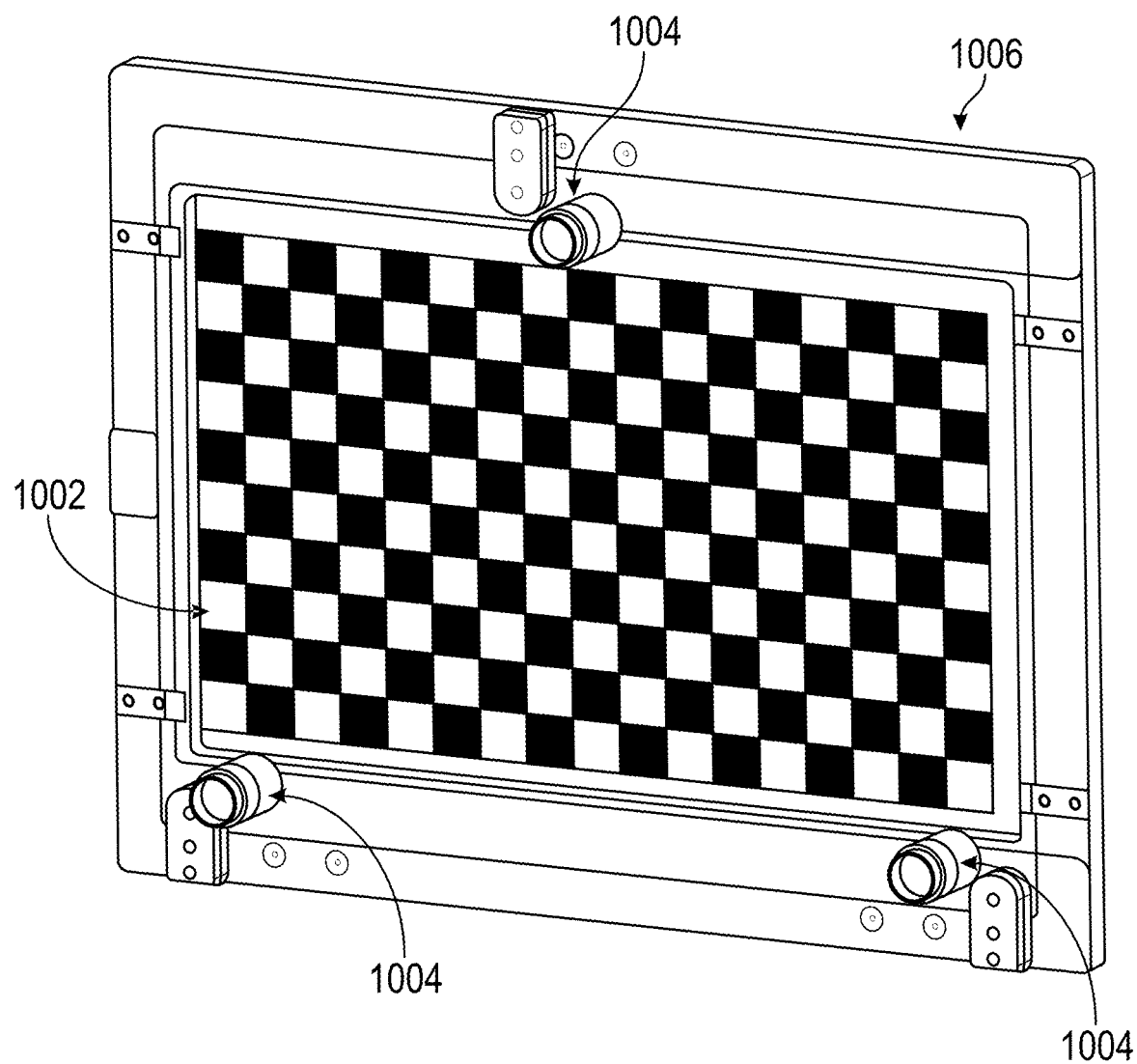
FIG. 10 illustrates an example calibration target that includes a rectilinear checkboard chart.

FIG. 10 illustrates an example calibration target that includes a rectilinear checkboard chart. A simple rectilinear test chart (calibration target) 1002 is shown below as an example. A rectilinear grid chart 1002 may in some cases be chosen over a circle chart due to high accuracy corner detection capabilities of grid chart image processing. In this example, 3 SMRs 1004 are used in a triangle configuration, but in some implementations, different numbers and configurations of SMRs 1004 may be used. A backlit photoetched chrome on glass chart design 1006 allows for extremely sharp edge contrast and high accuracy features.

Figures 11A, 11B:
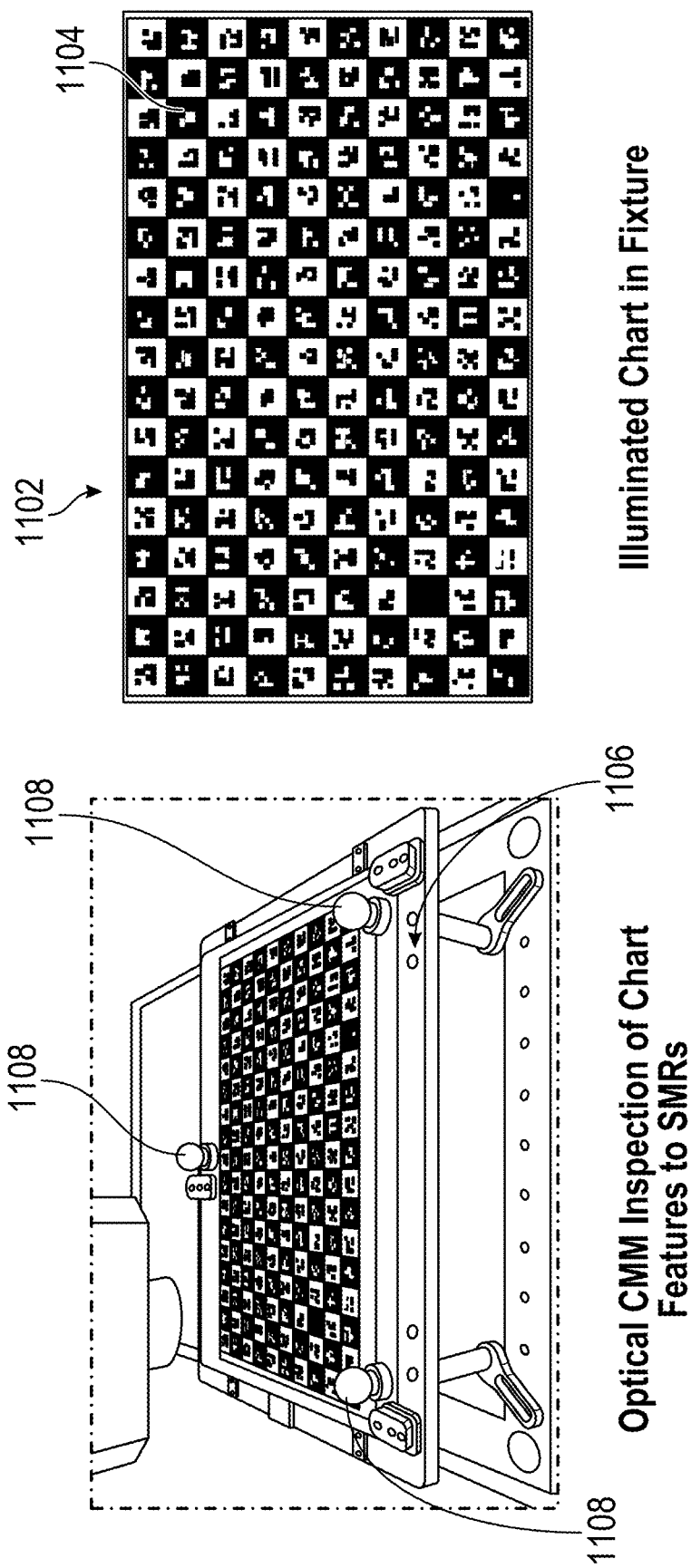
FIG. 11A illustrates a photograph of an example calibration assembly on an optical measuring machine (OMM).
FIG. 11B illustrates an example calibration target that includes a self-identifying binary code.

FIG. 11A illustrates a photograph of an example calibration assembly on an optical measuring machine (OMM). FIG. 11B illustrates an example calibration target that includes a self-identifying binary code. In another example, the rectilinear checkerboard chart 1102 may be enhanced with self-identifying binary codes 1104 (examples include CALTag and ARTag) to uniquely identify each square when image processing. The inclusion of self-identifying patterns 1104 in the calibration chart (calibration target) is not required but may improve processing robustness to variables such as lens distortion, non-uniform illumination and test pattern occlusion. The chart (target) 1102 may be backlit by a diffused LCD monitor for alternative color configurations and/or uniform lighting. An optical CMM (optical measurement machine or OMM) 1106 may be used to register the locations of chart (target) 1102 features relative to the markers (e.g., SMRs) 1108.

Camera Data Acquisition

Figure 12:
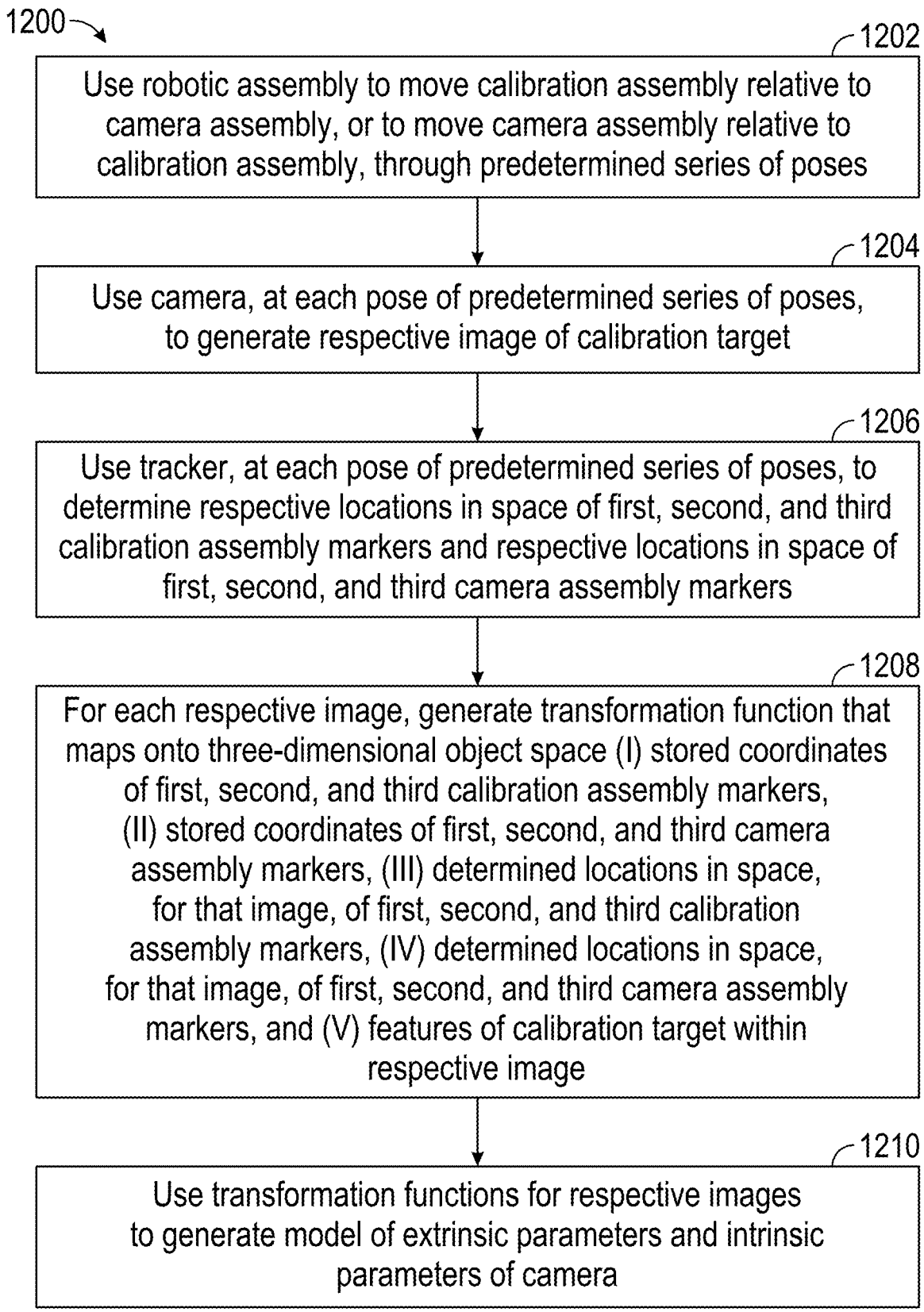
FIG. 12 illustrates a flowchart of an example method for generating a camera model with the system described herein.

FIG. 12 illustrates a flowchart of an example method for generating a camera model with the system described herein. A method 1200 of generating a camera model may include using a robotic assembly to move a calibration assembly relative to a camera assembly, or to move the camera assembly relative to the calibration assembly, through a predetermined series of poses (operation 1202). The calibration assembly may include a calibration target and first, second, and third calibration assembly markers. The first, second, and third calibration assembly markers may be coupled to the calibration target at respective positions. The camera assembly may include a mount, a camera coupled to the mount at a respective location, and first, second, and third camera assembly markers coupled to the mount at respective locations. The camera may have a field of view. The predetermined series of poses may, together, cause the calibration target to pass through at least a portion of the field of view of the camera. The method may also include using the camera, at each pose of the predetermined series of poses, to generate a respective image of the calibration target (operation 1204). The method may also include using a tracker, at each pose of the predetermined series of poses, to determine respective locations in space of the first, second, and third calibration assembly markers and respective locations in space of the first, second, and third camera assembly markers (operation 1206). The method may also include for each respective image, generating a transformation function that maps onto a three-dimensional object space (i) stored coordinates of the first, second, and third calibration assembly markers, (ii) stored coordinates of the first, second, and third camera assembly markers, (iii) the determined locations in space, for that image, of the first, second, and third calibration assembly markers, (iv) the determined locations in space, for that image, of the first, second, and third camera assembly markers, and (v) features of the calibration target within the respective image (operation 1208). The method may also include using the transformation functions for the respective images to generate a model of extrinsic parameters and intrinsic parameters of the camera (operation 1210).

Figure 13:
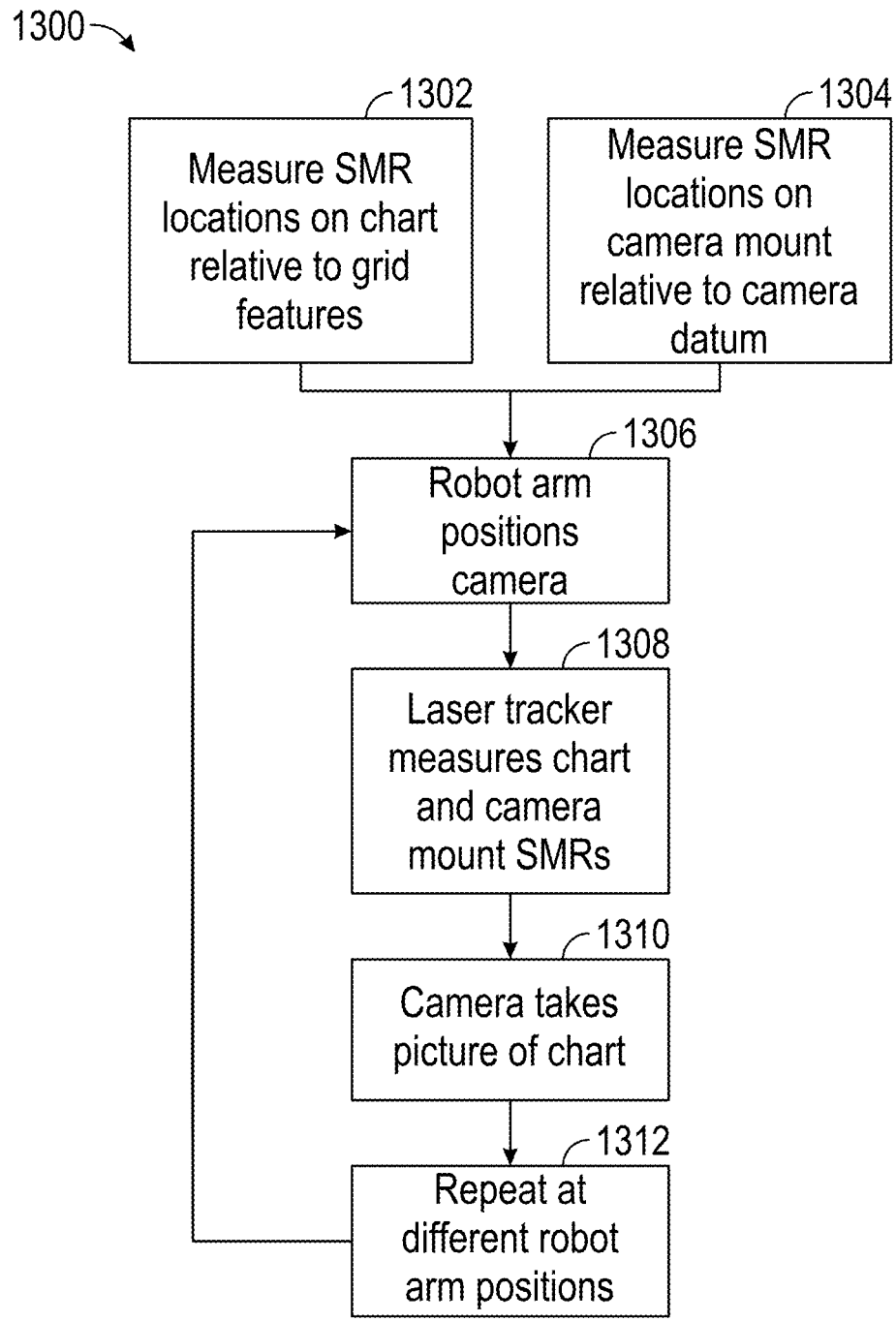
FIG. 13 illustrates a flowchart of an example method for generating a camera model with the system described herein.

FIG. 13 illustrates a flowchart of an example method for generating a camera model with the system described herein. An example method 1300 of generating a camera model is shown. The method 1300 may include measuring the calibration assembly marker locations relative to grid features (operation 1302). The method 1300 may also include measuring the camera assembly marker locations on the camera mount relative to the camera datum (operation 1304). Once the chart (calibration assembly) SMR (marker) locations are measured relative to the grid features and the camera mount (camera assembly) SMR (marker) locations are measured relative to the camera datum, the camera calibration process data collection may be performed.

The robot arm (robotic assembly) may be used to position the camera at different arm positions (operation 1306). At each position, the tracker (e.g., laser tracker) measures the location of the chart (calibration assembly) and camera mount (camera assembly) SMRs (markers) (operation 1308) and the camera takes a picture of the chart (target) (operation 1310). The steps (operations) may be repeated by positioning the camera at different arm positions (operation 1312).

Camera Calibration Process

The camera calibration process can be broken down into three major components: planning the relative motion between the chart (target) and the camera, executing data capture at relative locations corresponding to that motion plan, and signal processing that determines the camera model parameters. These components now will be described in greater detail.

Motion Plan

Figure 14:
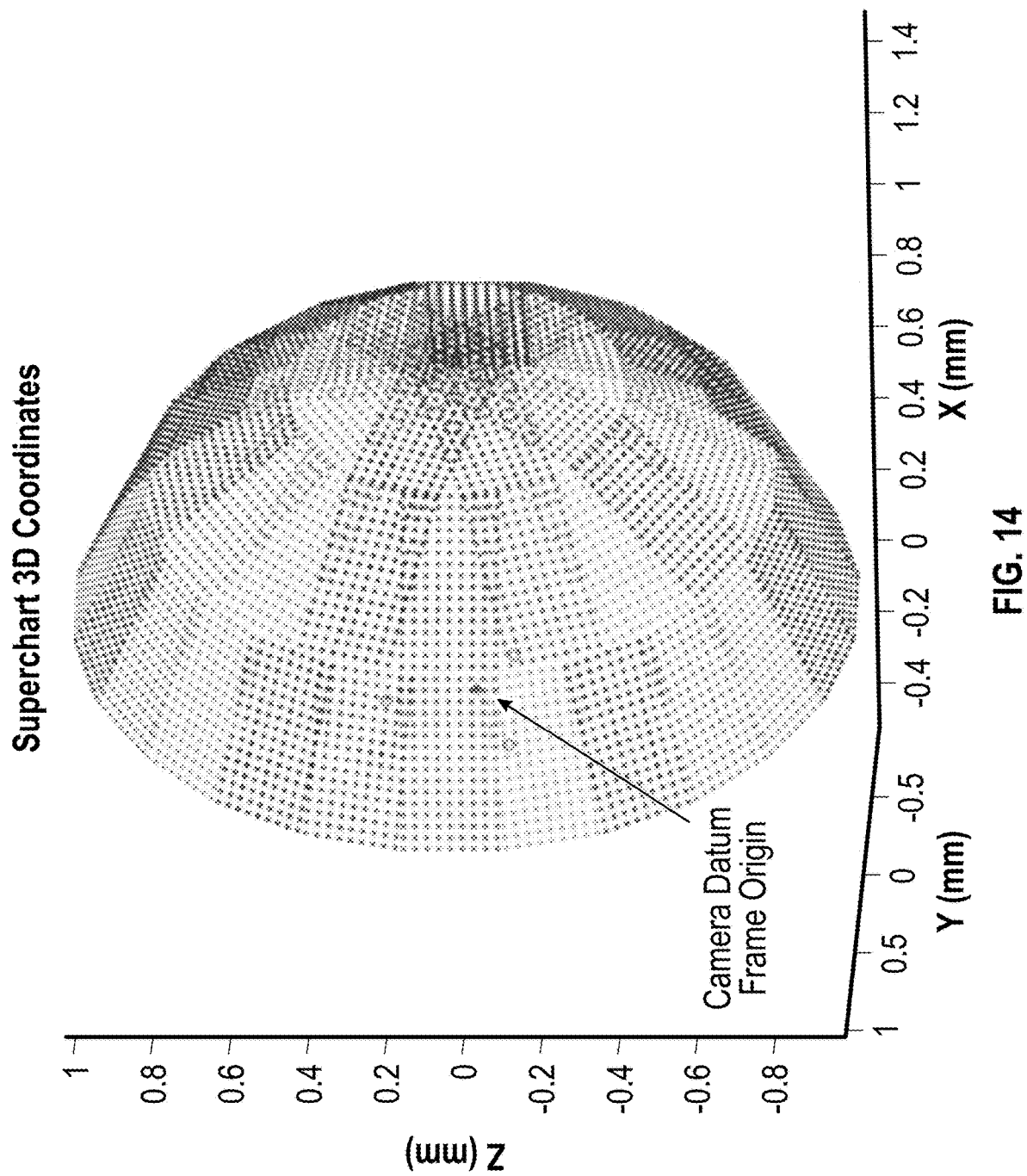
FIG. 14 illustrates an example hemispherical superchart.

FIG. 14 illustrates an example hemispherical superchart. Each position of the camera relative to the chart (target) results in a corresponding 2D chart (target) which may fill all or a portion of the camera's field of view. By changing the relative position many times, a composite "superchart" of chart (target) features may be produced. For a given set of nominal camera parameters, the calibration data collection sequence may be simulated with a pre-processing algorithm to calculate a motion plan which efficiently generates a suitable superchart geometry. The motion planning algorithm may include inputs such as CMM inspection results, camera pose, chart (target) position, nominal marker (SMR) positions, tracker position, and estimated camera parameters. A result of the motion planning step (operation) may be the nominal 3D positions of each calibration feature in a global coordinate system. An example of the 3D distribution of features generated by the motion planning step (operation) is shown in the figure below of a hemispherical superchart that can be used for wide field of view camera calibration.

Figures 15A, 15B:
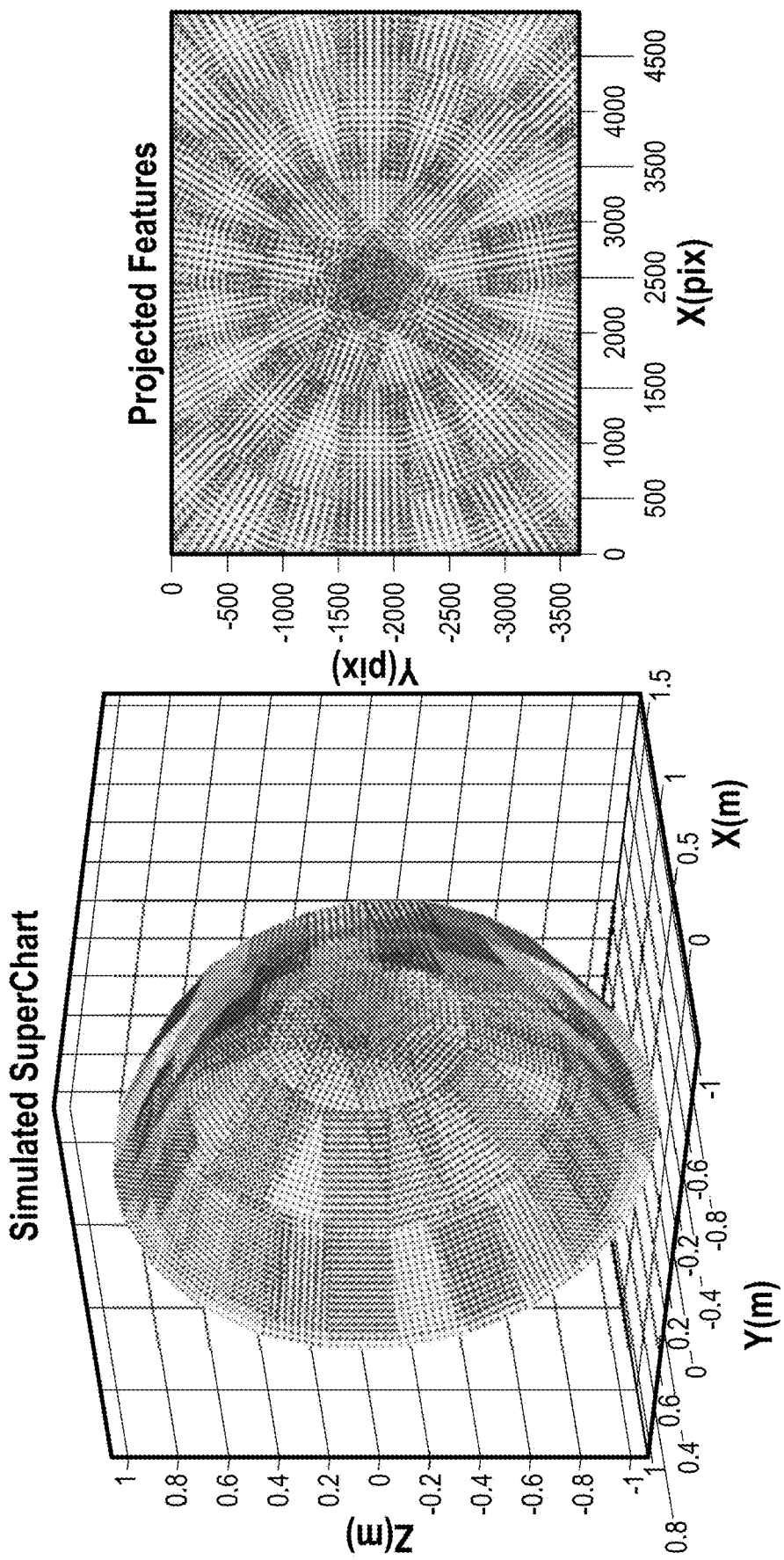
FIG. 15A illustrates an example 3-layer hemispherical superchart.
FIG. 15B illustrates the example 3-layer hemispherical superchart of FIG. 15A projected into 2D image space.

FIG. 15A illustrates an example 3-layer hemispherical superchart. FIG. 15B illustrates the example 3-layer hemispherical superchart of FIG. 15A projected into 2D image space. Supercharts may have multiple layers to provide data for focus calibration and improved extrinsic calibration. With a camera model projection algorithm, the 3D features from the motion planner may be converted to 2D image points for estimating target coverage on a candidate camera's image sensor. In the figure below, the 15,230 chart (target) features of a 3-layer hemispherical superchart are shown both in 3D object space (left, i.e., FIG. 15A) and projected into 2D image space (right, i.e., FIG. 15B) to demonstrate full coverage of the camera field of view.

FIG. 16A illustrates another example multi-layer hemispherical superchart. FIG. 16B illustrates the example multi-layer hemispherical superchart of FIG. 16A projected into 2D image space. In some examples (e.g., embodiments), a sparser multi-layer superchart is generated with both curved and flat segments to efficiently provide coverage of the camera field of view and target depth. For example, in the figure below, there are 12,344 chart (target) features in the image frame.

Data Capture

Figure 17:
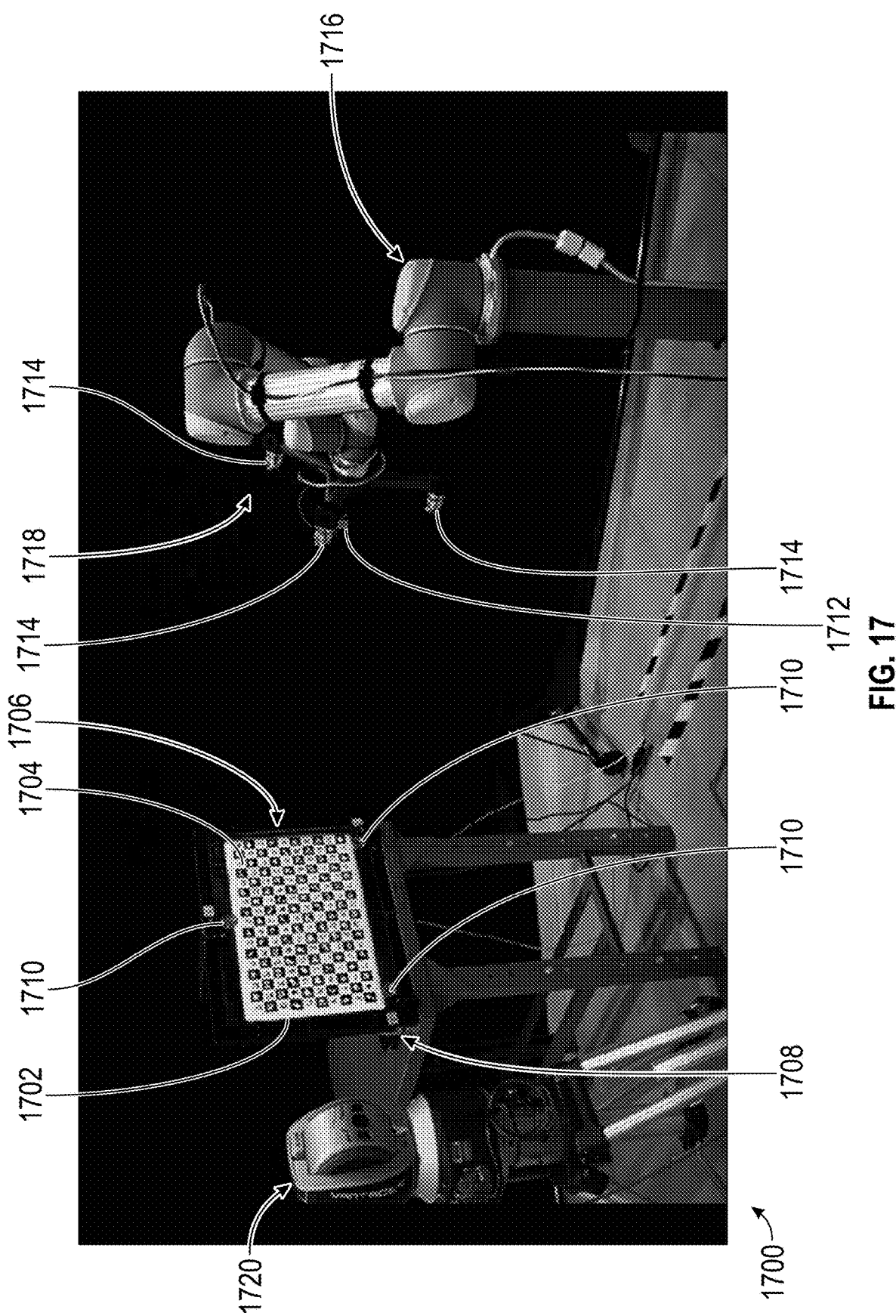
FIG. 17 illustrates a photograph of an example system for generating camera models.

FIG. 17 illustrates a photograph of an example system for generating camera models. An image of a real-world system 1700 is illustrated. A relatively typical data capture configuration is shown in the figure below. The test chart (target) 1702 uses self-identifying binary codes 1704 and is backlit by an LCD panel 1706 and is mounted onto a sliding platform 1708 with 3 SMRs 1710. The backlight color is configurable for testing color, monochrome and infrared cameras. The camera under test 1712 is also mounted with 3 SMRs 1714 onto a Universal Robots UR5 1716. This camera under test assembly (camera assembly) 1718 is mounted onto a rolling platform (not shown). The relative positions of all the SMRs 1710, 1714 are monitored with a FARO Vantage Laser Tracker 1720.

Figure 18:
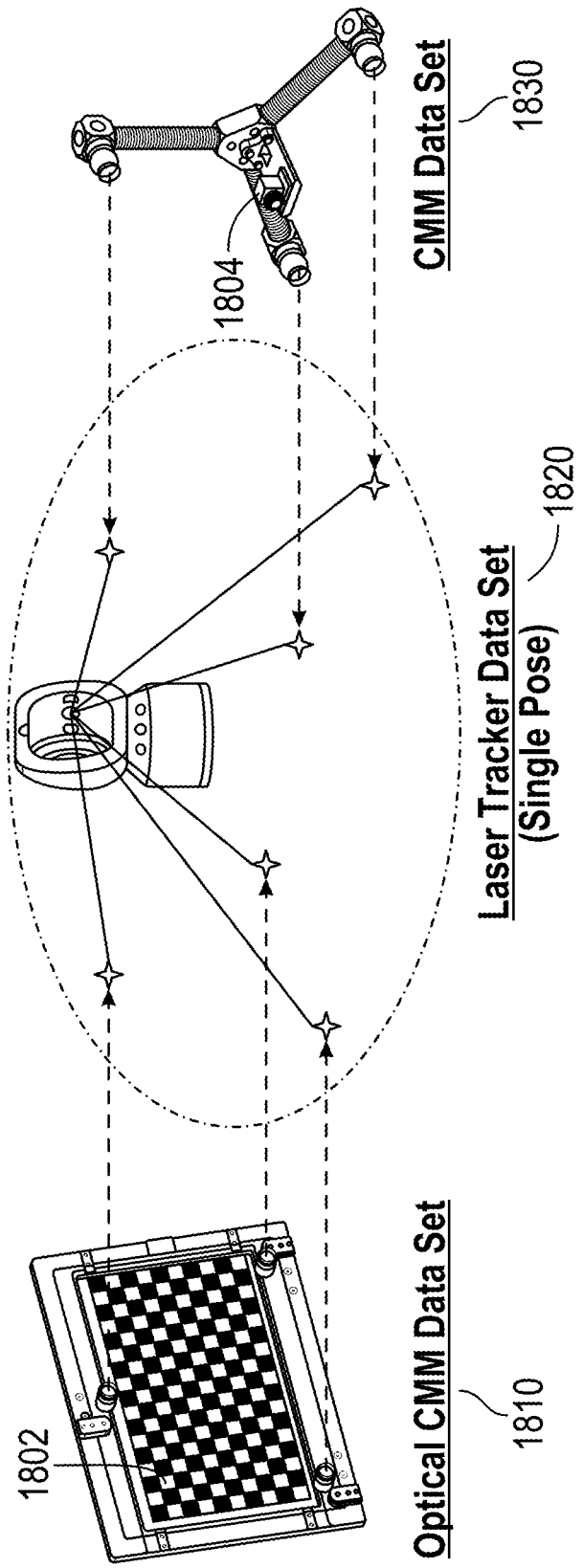
FIG. 18 illustrates an example of how the determined locations in space of the first, second, and third calibration assembly markers and of the first, second, and third camera assembly markers may be determined by a tracker.

FIG. 18 illustrates an example of how the determined locations in space of the first, second, and third calibration assembly markers and of the first, second, and third camera assembly markers may be determined by a tracker. The relative position between the chart (target) 1802 and the camera 1804 is set by the robot controller and confirmed. In one example (e.g., embodiment), the best fit rigid body transformation (translation and rotation) between the OMM data set 1810 and laser tracker data set 1820 and between the CMM data set 1830 and laser tracker data 1820 is found using the Kabsch algorithm. This minimizes the error between the 2 respective data sets without scaling the data.

Image Processing

Figure 19:
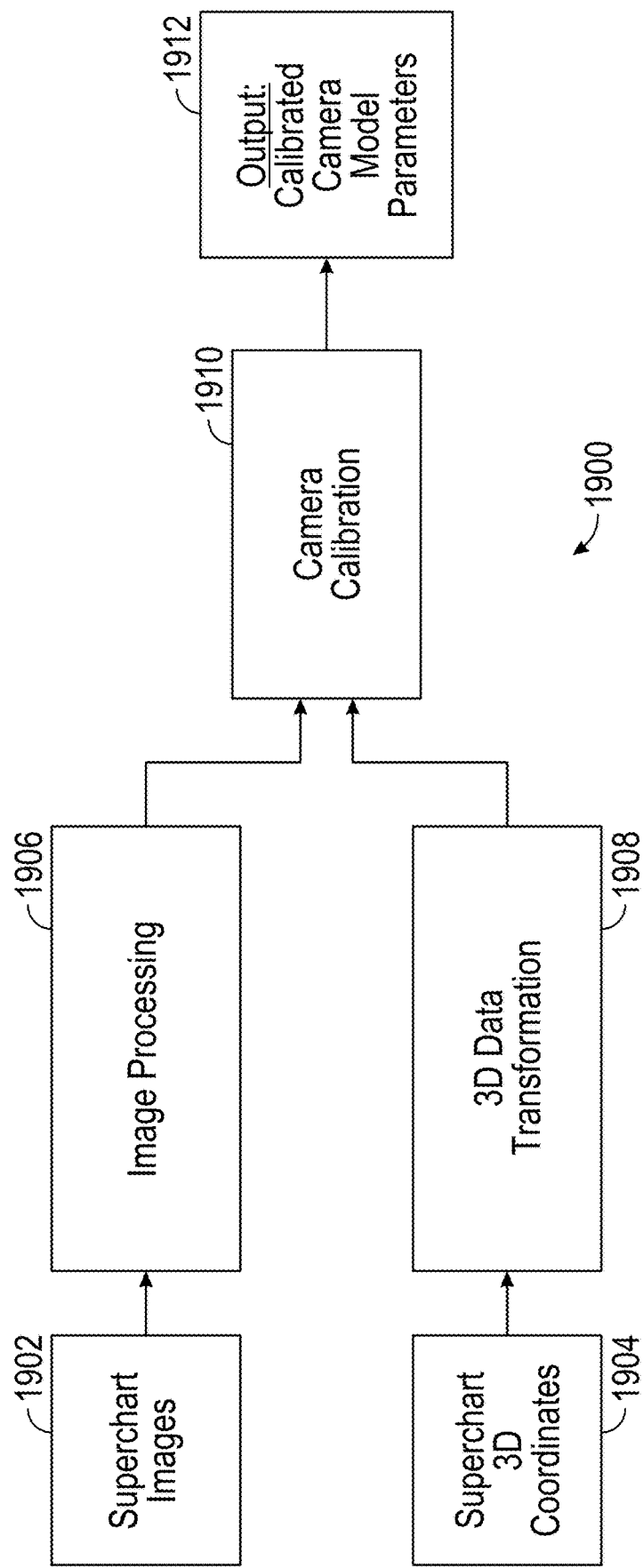
FIG. 19 illustrates a flowchart of an example method of generating camera model parameters.

FIG. 19 illustrates a flowchart of an example method of generating camera model parameters. An example method 1900 of image processing is shown. In some examples (e.g., embodiments), the camera model parameters are generated as shown in the figure below. The data processing may initially be split between image processing of the individual camera frames taken during data capture (operation 1902) and repackaging of the 3D tracker data (operation 1904). Processing of the images from the camera (operation 1906) may include, for example, object detection, smoothing, edge enhancing, morphological operations, etc. The 3D coordinates of chart (target) features based on tracker measurements are compiled and transformed to a common global coordinate system (operation 1908). The two data sets may then be combined to produce a calibration for the camera (operation 1910). The camera calibration may be used to output calibrated camera model parameters (operation 1912).

Figure 20:
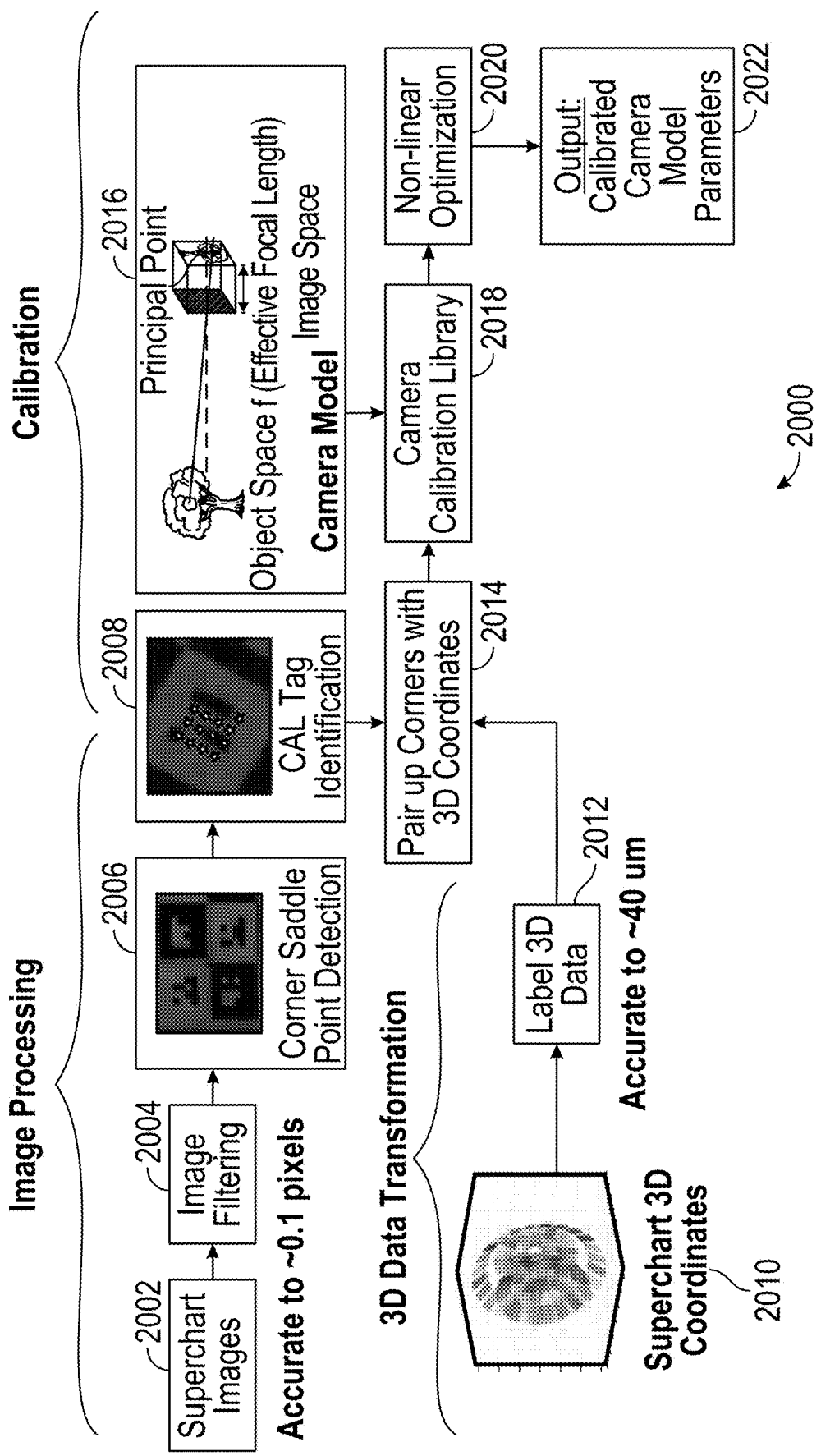
FIG. 20 illustrates a flowchart of another example method of generating camera model parameters.

FIG. 20 illustrates a flowchart of another example method of generating camera model parameters. For the example of a checkboard chart with self-identifying binary codes, the calibration process 2000 is shown in the figure below. The superchart images 2002 may be filtered to improve the results (operation 2004). Individual corners of the checkboard chart are first extracted and labeled (operation 2006). For the example of charts using CALTag self-identifying patterns on a checkboard chart, the corner between checkers may be extracted to an accuracy to ~0.1 pixels using algorithms such as the Harris corner finder saddle point algorithm as shown in the figure below (operation 2006). The CALTags may then be identified (operation 2008). The superchart 3D coordinates 2010 may be used to label 3D data to an accuracy to ~40 µm (operation 2012). The previously identified corners may then be paired up with 3D coordinates (operation 2014). A camera model 2016 may then be used to create a camera calibration library (operation 2018). The library may then to non-linearly optimized (operation 2020). Calibrated camera model parameters is the output (operation 2022).

Figure 21:
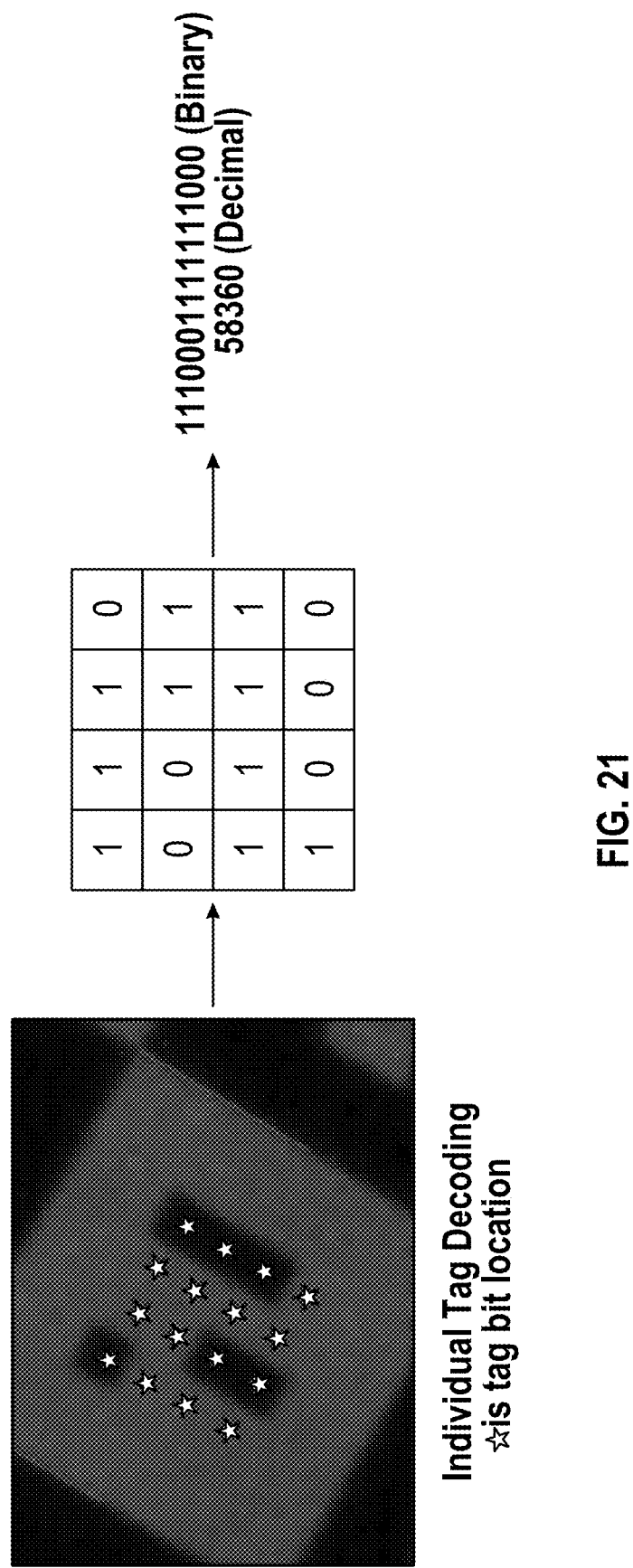
FIG. 21 illustrates an example of how a self-identifying binary code may be detected.

FIG. 21 illustrates an example of how a self-identifying binary code may be detected. An example of how embedded patterns in the checker features may be uniquely identified and assigned based on CALTag markings is shown below. The CALTag may be divided into a grid of 16 squares, each square representing a bit and having a value of either 0 or 1. The values of the grid may then be read starting at the upper left and continuing along a row before starting the next row, into a binary number. The binary number may be converted to a decimal number.

Figures 22A, 22B:
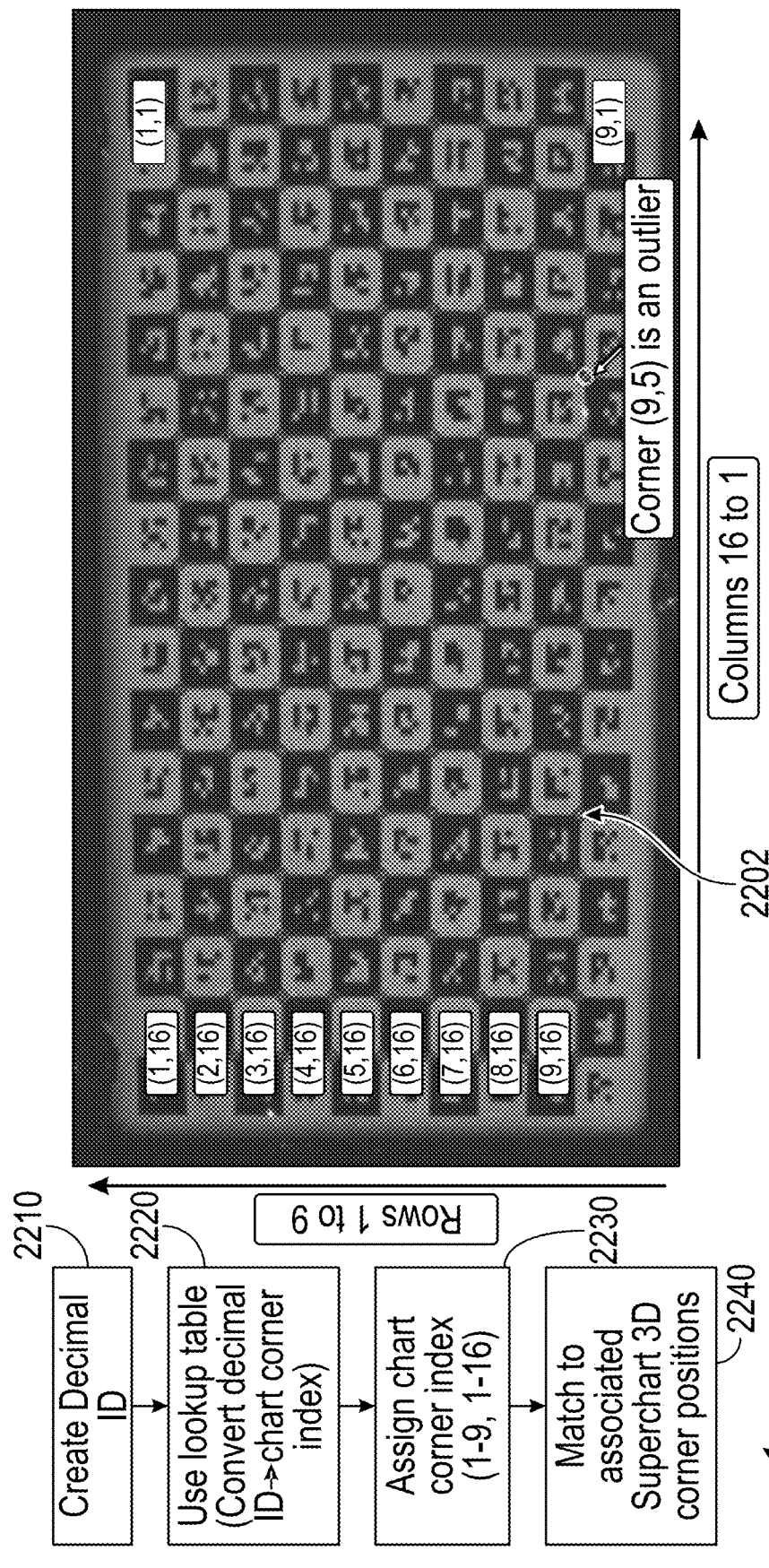
FIG. 22A illustrates a flowchart of an example method of identifying calibration target features.
FIG. 22B illustrates an example calibration target with identified features.

FIG. 22A illustrates a flowchart of an example method of identifying calibration target features. FIG. 22B illustrates an example calibration target with identified features. Method 2200 for matching corner features to associated positions in 3D space is shown. First, the decimal ID of the CALTag may be created, as described in the previous paragraph (operation 2210). A lookup table may be used to convert the decimal ID to a chart corner index (operation 2220). For a given image, each corner feature 2202 is assigned a corner index 2204 to for tracking through the calibration process (operation 2230). As an example, the image below shows how features may be identified and assigned a row and column index label. Additional steps (operations) may be taken during the image processing step (operation) to reject outliers that do not conform to expected indexing from image processing errors.

Figure 23:
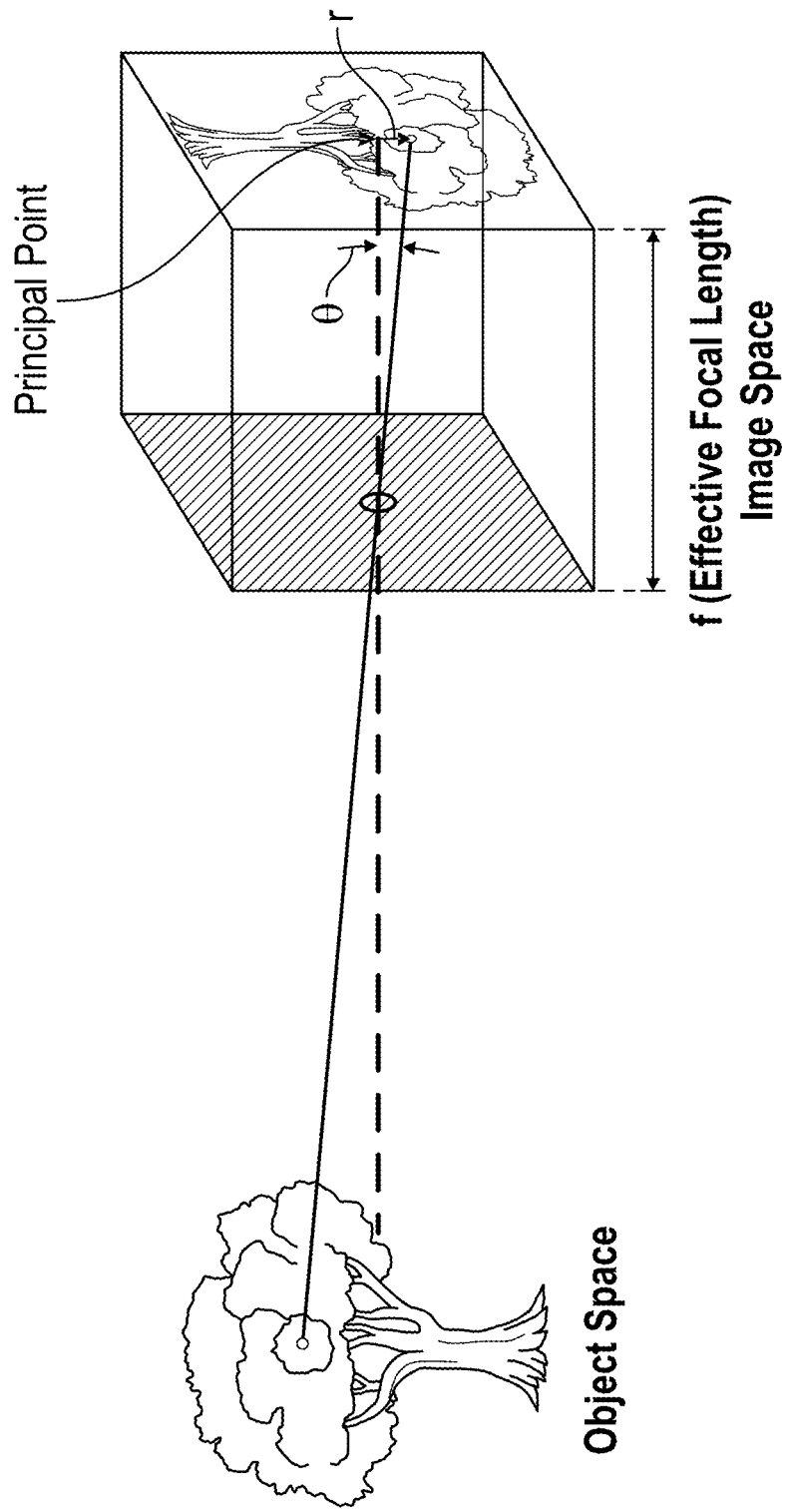
FIG. 23 illustrates an example simple pinhole model of a camera.

The final component of image processing may include the matching of these labeled features in image space with their corresponding position in 3D object space as determined from the tracker and OMM data (operation 2240). Once the point correspondences between object and image space are known, a parametric model may be solved to characterize the relationship between the two. FIG. 23 illustrates an example simple pinhole model of a camera. Such a model may be portrayed by a simple pinhole camera shown in the figure below where object space points are scaled to image points via focal length.

A robust camera model may be used to accurately relate object and image points, and may include terms for both intrinsic and extrinsic parameters. Intrinsic parameters may include terms that allow a mapping between camera coordinates and pixel coordinates in the image frame such as focal length, principal point, and distortion. Extrinsic parameters may include terms that allow definition of the location and orientation of the camera with respect to the world frame such as rotation and translation.

Table 1 below summarizes the number of terms that may exist in common camera models. As can be seen in table 1, extrinsic parameters include the three rotation terms and the three translation terms in a camera model. Intrinsic parameters include the two principal point terms, the two focal length terms, the five radial coefficients, the seven tangential coefficients, and the seven asymmetric coefficients. Of these terms, the rotation, translation, principal point, focal length, and radial coefficients are included in a radially symmetric camera model. In contrast, all 29 terms, including the tangential coefficients and the asymmetric coefficients, are included in a full camera model.

TABLE 1

Camera Model Variations

| Type of Parameter | Type of Terms | Number of Terms | Part of Symmetric Radial Camera Model (15 terms) | Part of Full Camera Model (29 terms) |
|---|---|---|---|---|
| Extrinsic Parameters | Rotation | 3 | Yes | Yes |
| | Translation | 3 | Yes | Yes |
| Intrinsic Parameters | Principal Point | 2 | Yes | Yes |
| | Focal Length | 2 | Yes | Yes |
| | Radial Coefficients | 5 | Yes | Yes |
| | Tangential Coefficients | 7 | No | Yes |
| | Asymmetric Coefficients | 7 | No | Yes |

Many imaging cameras do not have a perfectly linear relationship between field angle and image space coordinate, and this variance can be modelled with a multi-term polynomial. The Kannala radial polynomial is shown below. It can model symmetric radial distortions.

$$r(\theta) = \left(1 + k_1\theta^3 + k_2\theta^5 + k_3\theta^7 + \ldots + k_n\theta^{2n+1}\right)$$

$$\theta = \cos^{-1} z/\sqrt{\tilde{x}^2 + \tilde{y}^2 + \tilde{z}^2}$$

Furthermore, additional modifications to the mapping may be accomplished with additional polynomials such as the asymmetric radial and tangential terms presented by the Kannala full camera model shown below.

$$\Delta_r(\theta, \phi) = \left(l_1\theta + l_2\theta^3 + l_3\theta^5 + \ldots\right)(i_1\cos 1 + i_2\sin\phi + i_3\cos 2\theta + i_4\sin 2\phi)$$

$$\Delta_t(\theta, \phi) = \left(m_1\theta + m_2\theta^3 + m_3\theta^5 + \ldots\right)(j_1\cos\phi + j_2\sin\phi + j_3\cos 2\phi + j_4\sin 2\phi)$$

$$\phi = \tan^{-1} \tilde{y}/\tilde{x}$$

As there is no closed form solution for terms in a camera model, a merit function may be used to describe the reprojection error between object space and image space such that terms can be iterated in an optimizer. The minimization problem may be passed through a non-linear optimizer to determine the optimal distortion coefficients, focal length, and principal point. For example, the Levenberg-Marquardt algorithm may be used:

$$\min h(k_1, \ldots, k_n, l_1, \ldots, l_n, i_1, \ldots, i_n, m_1, \ldots,$$
$$m_n, j_1, \ldots, j_n, EFL, PP, R_{cw}, t_{cw}) = \sum_{c=1}^{n} \|I(c) - \tilde{I}(c)\|/n$$

In the equations above, I is the known pixel coordinates of the corners (e.g., image); $\tilde{I}$ is the estimated pixel coordinates of the corners; PP is the principal point, or the center of the camera plane; EFL is the effective focal length, or the distance from the pinhole to the image frame; $k_n$ are the radial distortion polynomial coefficients; $m_n$, $j_n$ are the tangential distortion polynomial coefficients; $i_n$, $l_n$ are the asymmetric radial distortion polynomial coefficients; $R_{cw}$ is the rotation matrix of the world reference frame in the camera reference frame; $t_{cw}$ is the translation vector of the world reference frame to the camera reference frame; X=(x, y, z) represents coordinates in 3D space in the datum reference frame; and $\tilde{X} = R_{cw}X + t_{cw}$.

Once a camera model has been developed, it may then be inverted to translate image space to object space. The reverse projection model may be useful for understanding how image space reprojection errors are reflected in the world frame by physical distance errors.

Note that the approach to calibration data capture presented in this disclosure is not predicated by a specific camera model or optimizer used to minimize reprojection error in the final step (operation). This approach may be flexible to solution via many camera models including the Brown-Conrady and Heikkila camera models and different camera configurations may be best fit by different models.

Calibration Results and Audit

The error between measured points and the locations that the calibrated camera model predicts may be measured in both image space and object space. A well calibrated camera predicts the measured points' locations accurately.

Figure 24B:
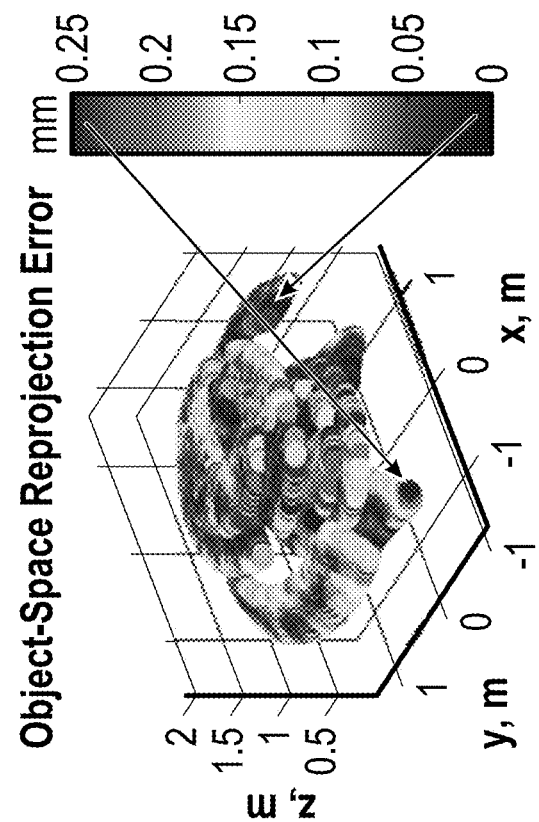
FIG. 24B illustrates the object-space reprojection error of the same example camera model as FIG. 24A.
Figure 24A:
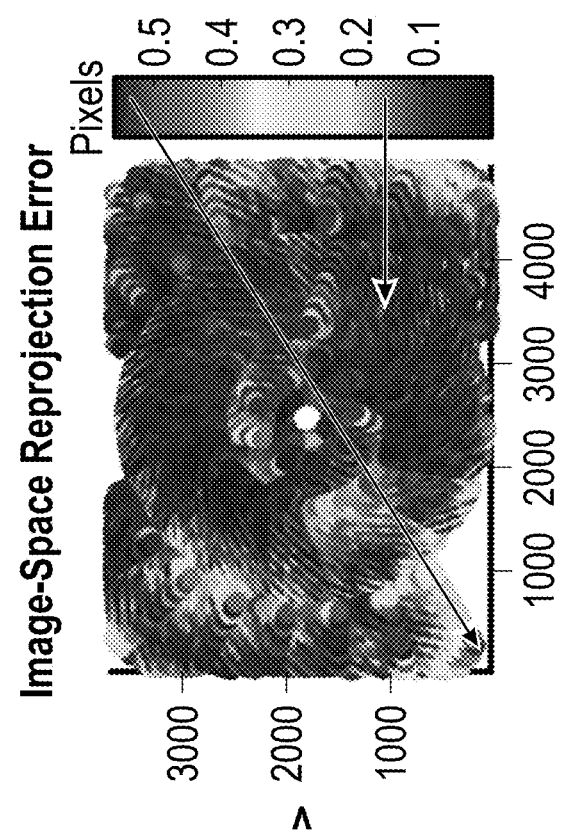
FIG. 24A illustrates the image-space reprojection error of an example camera model.

FIG. 24A illustrates the image-space reprojection error of an example camera model. FIG. 24B illustrates the object-space reprojection error of the same example camera model as FIG. 24A. In one example, the aforementioned 18 megapixel camera with 2.8 mm focal length lens was calibrated with mean image space errors of less than 0.1 pixels and mean object space errors of less than 0.1 mm as shown in plots below. In this example, a hemispherical superchart with two layers was generated. As shown in FIG. 24A, the image-space reprojection error was mostly less than 0.1 pixels, with only a few locations near the edges of the image space (primarily lower left and lower right) having an error of 0.3 pixels or greater. As shown in FIG. 24B, the object-space reprojection error of the same sample was mostly less than 0.1 mm, with a few locations near the edges of each respective hemispherical layer, in particular the inner hemispherical layer, having a reprojection error of greater than 0.1 mm.

These results may be compared to the published results in Table 2 below. Table 2 includes the image space accuracy (image space error) in pixels and the image accuracy (object space error) in microns of various methods of generating a camera model generally known in the art. Table 2 also lists the resolution in pixels of image space used by the various methods. As can be seen in table 2, the present systems and methods ("Quartus Flexible Camera Calibration") provide a lower image space error and a lower object space error than any listed method. Further, while the largest image resolution of another method is 1024 pixels by 768 pixels, the present systems and methods achieve lower errors while having an image resolution of 4912 pixels by 3684 pixels.

TABLE 2

| Tool/Device/Method | Image Space Accuracy (pix) | Image Accuracy (microns) | Resolution (pix) |
|---|---|---|---|
| Matlab Camera Calibration Example [1] | 0.180 | | |
| Kannala Paper (1) [2] | 0.089 | | 640 × 480 |
| Kannala Paper (2) [2] | 0.137 | | 1024 × 768 |
| Brown-Conrady Paper [3] | | 3.90 | 190 × 215 |
| Zhang Paper [4] | 0.335 | | 640 × 480 |
| Quartus Flexible Camera Calibration | 0.090 | 0.09 | 4912 × 3684 |

The numbers in brackets used in table 2 indicate the reference from which the data in that row was obtained. [1] refers to "Evaluating the Accuracy of Single Camera Calibration." Evaluating the Accuracy of Single Camera Calibration-MATLAB & Simulink. [2] refers to Kannala, J., & Brandt, S. S. (1995). A Generic Camera Model and Calibration Method for Conventional, Wide-Angle, and Fish-Eye Lenses. [3] refers to Brown, D. C. (1966). Decentering Distortion of Lenses. [4] refers to Zhang, Z. (1999). Flexible Camera Calibration by Viewing a Plane From Unknown Orientations. The entire contents of each of the above references are incorporated by reference herein.

Figure 25:
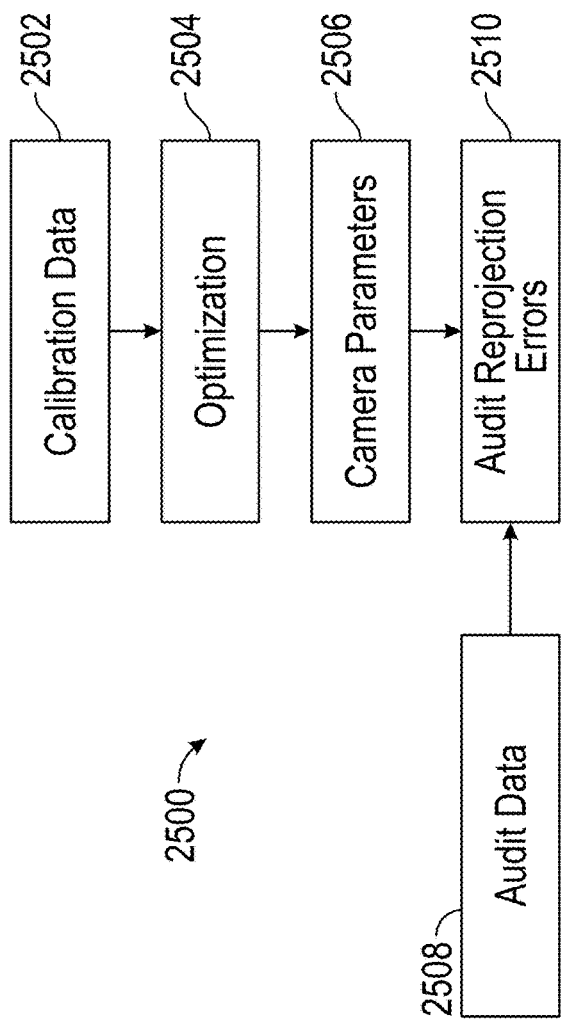
FIG. 25 illustrates a flowchart of an example method of generating an audit data set.

FIG. 25 illustrates a flowchart of an example method of generating an audit data set. An example method 2500 for generating audit data sets is shown. In some examples (e.g., embodiments), the inventive camera calibration station (system for generating a camera model) may be used to generate audit data sets. An audit data set may be a set of images that have the same traceability of object points but are sufficiently different from the object points used to perform the calibration. An audit verifies that the calibrated camera accurately predicts the locations of objects at arbitrary locations (other than the calibration points). This may possibly ensure a quality calibration, for example potentially confirming that the optimizer did not get stuck in a local minimum. The calibration data 2502 may be optimized (operation 2504). The optimized data may then be used to generate camera parameters (operation 2506). The generated camera parameters may be used in conjunction with audit data 2508 in order to output audit reprojection errors (operation 2510).

Figure 26:
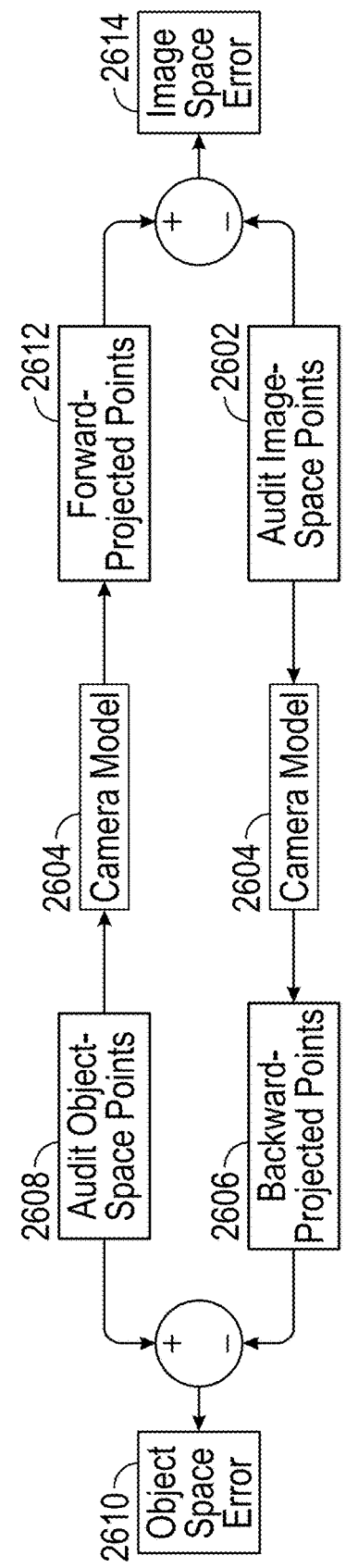
FIG. 26 illustrates a flowchart of an example method of determining object space error and image space error using an audit model.

FIG. 26 illustrates a flowchart of an example method of determining object space error and image space error using an audit model. In accordance with some examples (e.g., embodiments), the audit can be used to compare the object space errors in distance units with the image space errors in pixel units. For example, the audit image-space points 2602 may be fed into the camera model 2604 to generate backward-projected points 2606 in object space. The backward-projected points 2606 may be compared to the audit object-space points 2608 to determine the object space error 2610 of the camera model 2604. The audit object-space points 2608 may also be fed into the camera model 2604 to generate forward-projected points 2612 in image space. The forward-projected points 2612 may be compared to the audit image-space points 2602 to determine the image space error 2614 of the camera model 2604.

Figures 27A, 27B:
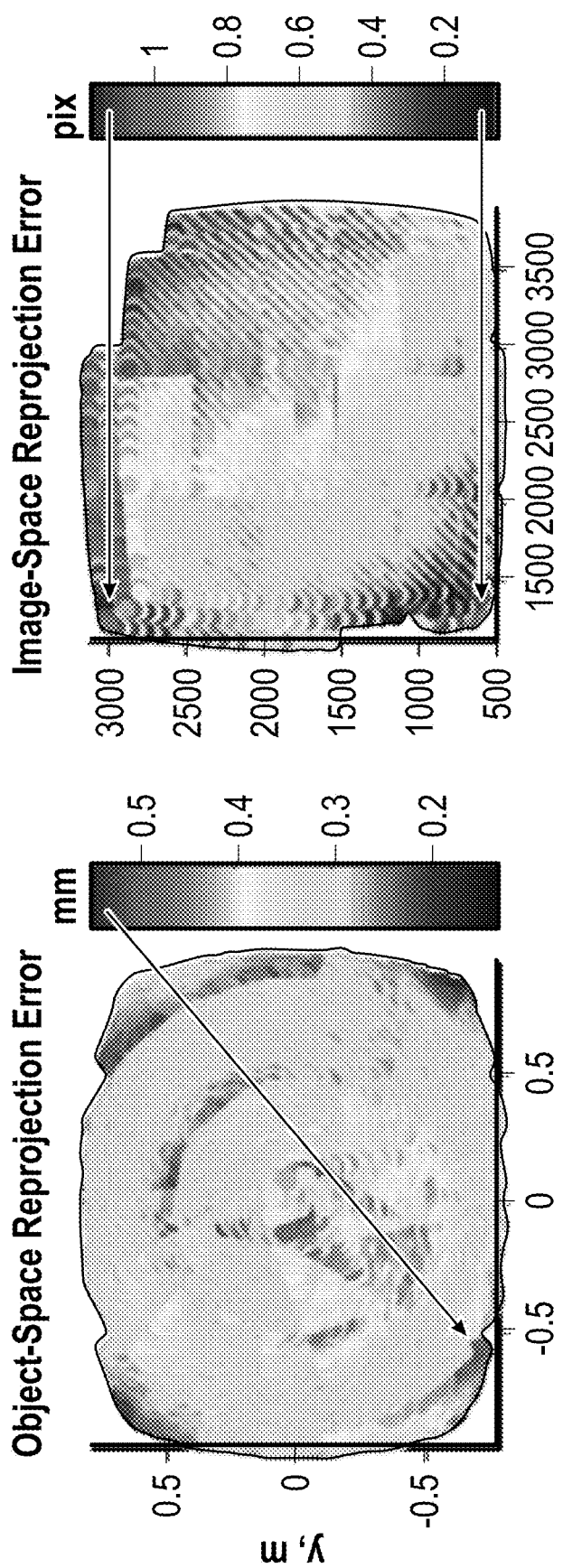
FIG. 27A illustrates the object-space reprojection error of an example camera model as determined by using an audit model.
FIG. 27B illustrates the image-space reprojection error of the same example camera model as FIG. 27A as determined by using the same audit model as FIG. 27A.

FIG. 27A illustrates the object-space reprojection error of an example camera model as determined by using an audit model. FIG. 27B illustrates the image-space reprojection error of the same example camera model as FIG. 27A as determined by using the same audit model as FIG. 27A. In one example illustrated below, the image-space reprojection errors were around 0.3 pixels, and the object-space reprojection errors were around 0.5 mm.

It will be appreciated that the present camera models may be used in any manner such as known in the art. For example, a camera calibrated as described herein may be used to precisely localize the pose of a robotic system in a visual servoing task. This allows such a system to interact with the environment with high accuracy. Many other applications exist.

It is to be understood that any respective features/examples of each of the aspects of the disclosure as described herein may be implemented together in any appropriate combination, and that any features/examples from any one or more of these aspects may be implemented together with any of the features of the other aspect(s) as described herein in any appropriate combination to achieve the benefits as described herein.

While various illustrative examples are described above, it will be apparent to one skilled in the art that various changes and modifications may be made therein without departing from the invention. The appended claims are intended to cover all such changes and modifications that fall within the true spirit and scope of the invention.

What is claimed is:

1. A method of generating a camera model, comprising:
   using a robotic assembly to move a calibration assembly relative to a camera assembly, or to move the camera assembly relative to the calibration assembly, through a series of poses to cause a calibration target to pass through at least a portion of a field of view (FOV) of the camera assembly;
   using a camera of the camera assembly at the series of poses to generate a respective image of the calibration target; and
   using a tracker at the series of poses to determine respective locations in space of a plurality of calibration assembly markers of the calibration assembly and respective locations in space of a plurality of camera assembly markers of the camera assembly;
   generating, for each respective image, a transformation function that maps onto a three-dimensional object space features of the calibration target within the respective image.

2. The method of claim 1, wherein the generating, for each respective image, the transformation function that maps onto a three-dimensional object space further comprise:
   i) stored coordinates of the plurality of calibration assembly markers,
   ii) stored coordinates of the plurality of camera assembly markers,
   iii) the determined respective locations in space, for that image, of the plurality of calibration assembly markers, and
   iv) the determined respective locations in space, for that image, of the plurality of camera assembly markers.

3. The method of claim 1, further comprising:
   using the transformation function for the respective images to generate a model of extrinsic parameters and intrinsic parameters of the camera.

4. The method of claim 1, wherein the calibration assembly markers respectively comprise spherically mounted retroreflectors (SMRs); and/or
   wherein the camera assembly markers respectively comprise spherically mounted retroreflectors (SMRs).

5. The method of claim 1, wherein the tracker comprises a laser tracker.

6. The method of claim 1, further comprising:
   determining coordinates of the plurality of camera assembly markers in a camera mount datum frame.

7. The method of claim 1, further comprising:
   determining the locations of features of the calibration target relative to the plurality of calibration assembly markers.

8. The method of claim 1, wherein the series of poses, together, cause the calibration target to generate a superchart, wherein the superchart comprises a hemispherical shape and/or multiple layers.

9. A non-transitory computer-readable medium storing instructions that, when executed by a processor, cause the processor to perform operations for generating a camera model, the operations comprising:
   instructing a robotic assembly to move a calibration assembly relative to a camera assembly, or to move the camera assembly relative to the calibration assembly, through a series of poses to cause a calibration target to pass through at least a portion of a field of view (FOV) of the camera assembly;

instructing a camera of the camera assembly at the series of poses to generate a respective image of the calibration target; and instructing a tracker at the series of poses to determine respective locations in space of a plurality of calibration assembly markers of the calibration assembly and respective locations in space of a plurality of camera assembly markers of the camera assembly.

10. The non-transitory computer-readable medium of claim 9, the operations comprising:

generating, for each respective image, a transformation function that maps onto a three-dimensional object space features of the calibration target within respective image stored coordinates of the plurality of calibration assembly markers.

11. The non-transitory computer-readable medium of claim 9, the operations comprising:

generating, for each respective image, a transformation function that maps onto a three-dimensional object space features of the calibration target within respective image stored coordinates of the plurality of camera assembly markers.

12. The non-transitory computer-readable medium of claim 9, the operations comprising:

generating, for each respective image, a transformation function that maps onto a three-dimensional object space features of the calibration target within the respective image the determined respective locations in space, for that image, of the plurality of calibration assembly markers.

13. The non-transitory computer-readable medium of claim 9, the operations comprising:

generating, for each respective image, a transformation function that maps onto a three-dimensional object space features of the calibration target within the respective image the determined respective locations in space, for that image, of the plurality of camera assembly markers.

14. A computer system for generating a camera model, comprising:

at least one memory storing instructions; and at least one processor configured to execute the instructions to perform operations comprising:

instructing a robotic assembly to move a calibration assembly relative to a camera assembly, or to move the camera assembly relative to the calibration assembly, through a series of poses to cause a calibration target to pass through at least a portion of a field of view (FOV) of the camera assembly;

instructing a camera of the camera assembly at the series of poses to generate a respective image of the calibration target; and instructing a tracker at the series of poses to determine respective locations in space of a plurality of calibration assembly markers of the calibration assembly and respective locations in space of a plurality of camera assembly markers of the camera assembly.

15. The system of claim 14, the operations further comprising:

generating, for each respective image, a transformation function that maps onto a three-dimensional object space:

i) stored coordinates of the plurality of calibration assembly markers, ii) stored coordinates of the plurality of camera assembly markers, iii) the determined respective locations in space, for that image, of the plurality of calibration assembly markers, iv) the determined respective locations in space, for that image, of the plurality of camera assembly markers, and v) features of the calibration target within the respective image.

16. The system of claim 14, the operations further comprising:

generating, for each respective image, a transformation function that maps onto a three-dimensional object space; and using the transformation function for the respective images to generate a model of extrinsic parameters and intrinsic parameters of the camera.

17. The system of claim 14, wherein the plurality of calibration assembly markers comprise spherically mounted retroreflectors (SMRs).

18. The system of claim 14, wherein the plurality of calibration camera assembly markers comprise spherically mounted retroreflectors (SMRs).

19. The system of claim 14, wherein the calibration target comprises a rectilinear checkerboard chart and/or a self-identifying binary code.

20. The system of claim 14, wherein the instructions further comprise:

for each respective image, processing the image before generating a transformation function, wherein the processing of the image comprises at least one of object detection, smoothing, edge enhancing, and morphological operations.

* * * * *